United States Patent
Sakuraba

Patent Number: 5,850,224
Date of Patent: Dec. 15, 1998

[54] THREE DIMENSIONAL PARALLEL DRAWING APPARATUS FOR SYNTHESIZING GRAPHICS DATA WITH IMAGE DATA USING A PIXEL DEPTH BUFFER AND AN IMAGE DEPTH REGISTER

[75] Inventor: Takahiro Sakuraba, Kawasaki, Japan

[73] Assignee: Fujitsu Limited, Tokyo, Japan

[21] Appl. No.: 738,604

[22] Filed: Oct. 29, 1996

Related U.S. Application Data

[62] Division of Ser. No. 61,087, May 13, 1993, Pat. No. 5,586,234.

[30] Foreign Application Priority Data

| | | | |
|---|---|---|---|
| May 15, 1992 | [JP] | Japan | 122987 |
| Aug. 31, 1992 | [JP] | Japan | 230756 |
| Oct. 16, 1992 | [JP] | Japan | 278665 |
| Apr. 20, 1993 | [JP] | Japan | 92695 |
| Apr. 20, 1993 | [JP] | Japan | 92696 |

[51] Int. Cl.$^6$ ............................................ G06T 15/00
[52] U.S. Cl. ......................................................... 345/422
[58] Field of Search ........................... 395/119, 121–122, 395/115–116, 474, 497.01, 497.02, 497.03; 345/418–419, 421–422, 567–569, 511, 512, 435, 114–116, 425

[56] References Cited

U.S. PATENT DOCUMENTS

| | | | |
|---|---|---|---|
| 4,343,037 | 8/1982 | Bolton | 395/130 |
| 4,586,038 | 4/1986 | Sims et al. | 395/130 |
| 4,692,880 | 9/1987 | Merz et al. | 395/130 |
| 4,961,153 | 10/1990 | Frederickson et al. | 395/122 |
| 5,097,427 | 3/1992 | Lathrop et al. | 395/130 |
| 5,101,365 | 3/1992 | Westberg et al. | 395/122 |
| 5,153,936 | 10/1992 | Morris et al. | 395/128 |
| 5,222,205 | 6/1993 | Larson et al. | 395/130 |
| 5,224,208 | 6/1993 | Miller, Jr. et al. | 395/130 |
| 5,230,039 | 7/1993 | Grossman et al | 395/130 |

(List continued on next page.)

FOREIGN PATENT DOCUMENTS

| | | |
|---|---|---|
| 63-80375 | 4/1988 | Japan . |
| 63-98074 | 4/1988 | Japan . |

OTHER PUBLICATIONS

James, Rahner, "Real–Time Animation", *Dr. Dobbs Magazine*, Jan. 1990, pp. 16–24.

U.S. application No. 08/061,087, Sakuraba et al., filed May 13, 1993.

Treatise presented in Autumn 1992 Meeting of Institute of Electronics and Communication Engineers of Japan, *High Speed, High Performance Three–Dimensional CG System*, Subaru, 7 pages.

Treatise in *Nikkei Electronics*, Apr. 4, 1993, (No. 578), pp. 148–154.

(List continued on next page.)

*Primary Examiner*—Joseph H. Feild
*Assistant Examiner*—Rudolph Buchel
*Attorney, Agent, or Firm*—Staas & Halsey

[57] ABSTRACT

A three-dimensional graphics drawing apparatus having a plurality of frame buffers, a Z buffer and a Z register. The frame buffers are for writing pixel data into an address designated by coordinate values (X, Y) of ZY display coordinates and for storing an image. The Z buffer is for storing a plurality of coordinate values (Z) indicating a depth direction for each pixel data written by the frame buffer. The Z register is an alternative to the Z buffer and is used for writing a single coordinate value (Z) in place of storing the coordinate value Z for every pixel in the Z buffer, when the coordinate value (Z) in the depth direction of the pixel data stored in the frame buffer have the same value for all of the pixel data. A merge unit is provided for selecting visible pixel data from the plurality of pixel data read from the frame buffer on the basis of the coordinate value (Z) in the Z buffer and the Z register. The merge unit subsequently writes the selected pixel data into a frame buffer for synthesis.

3 Claims, 44 Drawing Sheets

U.S. PATENT DOCUMENTS

| | | | |
|---|---|---|---|
| 5,319,744 | 6/1994 | Kelly et al. | 395/136 |
| 5,325,471 | 6/1994 | Inoue | 395/127 |
| 5,333,245 | 7/1994 | Vecchione | 395/130 |
| 5,361,386 | 11/1994 | Watkins et al. | 395/130 |
| 5,369,736 | 11/1994 | Kato et al. | 395/125 |
| 5,379,371 | 1/1995 | Usami et al. | 395/128 |
| 5,490,238 | 2/1996 | Watkins | 395/122 |
| 5,497,453 | 3/1996 | Megahed et al. | 395/122 |
| 5,572,636 | 11/1996 | Sakuraba et al. | 395/130 |
| 5,586,234 | 12/1996 | Sakuraba et al. | 395/130 |
| 5,621,866 | 4/1997 | Murata et al. | 345/422 |

OTHER PUBLICATIONS

Program Cover Letter of 1992 Autumn Meeting of Institute of Electronics and Communication Engineers of Japan.

Hasegawa, Osamu et al. *Real–time Moving Human Face Synthesis Using a Parallel Computer Network*, Industrial Electronics, Control and Instrumentation, 1991 International Conference.

Dudgeon, James E. et al. *Algorithms for Graphics Texture Mapping*, System Theory, 1991 Southeastern Symposium.

Foley, James D. et al. *Computer Graphics: Principles and Practices*, Addison–Wesley Publishing Co., 2nd ed pp. 741–745, 800, (1990).

| (u, v) | (s, t) | INTEGER FORMING PROCESS (s, t) | TEXTURE COLOR VALUE |
|---|---|---|---|
| (0, 0) | (0.00, 0) | (0, 0) | A |
| (1, 0) | (1.75, 0) | (1, 0) | B |
| (2, 0) | (3.50, 0) | (3, 0) | D |
| (3, 0) | (5.25, 0) | (5, 0) | F |
| (4, 0) | (7.00, 0) | (7, 0) | H |

FIG.21

| | |
|---|---|
| U V APEX COORDINATES | O (uo, vo) |
| | P (uo, vo) |
| | Q (uo, ve) |
| | R (ue, ve) |
| S T APEX COORDINATES | O (so, to) |
| | P (so, to) |
| | Q (so, te) |
| | R (se, te) |
| MAGNIFICATION N | |
| ETC | |

FIG.24

|   | X | | | |
|---|---|---|---|---|
| Y | | 0 0 | 0 1 | 1 0 | 1 1 |
| 0 0 | 0.0 | 0.25 | 0.5 | 0.75 |
| 0 1 | 0.0 | 0.25 | 0.5 | 0.75 |
| 1 0 | 0.0 | 0.25 | 0.5 | 0.75 |
| 1 1 | 0.0 | 0.25 | 0.5 | 0.75 |

FIG.25

|   | X | | | |
|---|---|---|---|---|
| Y | | 0 0 | 0 1 | 1 0 | 1 1 |
| 0 0 | 0.0 | 0.5 | 0.25 | 0.75 |
| 0 1 | 0.25 | 0.75 | 0.0 | 0.5 |
| 1 0 | 0.75 | 0.0 | 0.5 | 0.25 |
| 1 1 | 0.5 | 0.25 | 0.75 | 0.0 |

FIG.26

| | | \multicolumn{4}{c}{X} | | | |
|---|---|---|---|---|---|
| | | 0 0 | 0 1 | 1 0 | 1 1 |
| Y | 0 0 | 0.0 | 0.75 | 0.75 | 1.5 |
| | 0 1 | 0.25 | 1.00 | 0.5 | 1.25 |
| | 1 0 | 0.75 | 0.25 | 1.0 | 1.00 |
| | 1 1 | 0.5 | 0.5 | 1.25 | 0.75 |

FIG.27

| | | \multicolumn{4}{c}{X} | | | |
|---|---|---|---|---|---|
| | | 0 0 | 0 1 | 1 0 | 1 1 |
| Y | 0 0 | 0.0 | 0.0 | 0.0 | 0.0 |
| | 0 1 | 0.25 | 0.25 | 0.25 | 0.25 |
| | 1 0 | 0.5 | 0.5 | 0.5 | 0.5 |
| | 1 1 | 0.75 | 0.75 | 0.75 | 0.75 |

FIG.28

| | | X | | | |
|---|---|---|---|---|---|
| | | 0 0 | 0 1 | 1 0 | 1 1 |
| Y | 0 0 | 0.0 | 0.25 | 0.75 | 0.5 |
| | 0 1 | 0.5 | 0.75 | 0.0 | 0.25 |
| | 1 0 | 0.25 | 0.0 | 0.5 | 0.75 |
| | 1 1 | 0.75 | 0.5 | 0.25 | 0.0 |

FIG.29

| | | X | | | |
|---|---|---|---|---|---|
| | | 0 0 | 0 1 | 1 0 | 1 1 |
| Y | 0 0 | 0.0 | 0.25 | 0.75 | 0.5 |
| | 0 1 | 0.75 | 1.0 | 0.25 | 0.5 |
| | 1 0 | 0.75 | 0.5 | 1.00 | 1.25 |
| | 1 1 | 1.5 | 1.25 | 1.00 | 0.75 |

| | | X | | | | | | | |
|---|---|---|---|---|---|---|---|---|---|
| | | 000 | 001 | 010 | 011 | 100 | 101 | 110 | 111 |
| Y | 000 | 0.0 | 0.125 | 0.25 | 0.375 | 0.5 | 0.625 | 0.75 | 0.875 |
| | 001 | 0.0 | 0.125 | 0.25 | 0.375 | 0.5 | 0.625 | 0.75 | 0.875 |
| | 010 | 0.0 | 0.125 | 0.25 | 0.375 | 0.5 | 0.625 | 0.75 | 0.875 |
| | 011 | 0.0 | 0.125 | 0.25 | 0.375 | 0.5 | 0.625 | 0.75 | 0.875 |
| | 100 | 0.0 | 0.125 | 0.25 | 0.375 | 0.5 | 0.625 | 0.75 | 0.875 |
| | 101 | 0.0 | 0.125 | 0.25 | 0.375 | 0.5 | 0.625 | 0.75 | 0.875 |
| | 110 | 0.0 | 0.125 | 0.25 | 0.375 | 0.5 | 0.625 | 0.75 | 0.875 |
| | 111 | 0.0 | 0.125 | 0.25 | 0.375 | 0.5 | 0.625 | 0.75 | 0.875 |

FIG.34

| | X | | | | | | | |
|---|---|---|---|---|---|---|---|---|
| | 000 | 001 | 010 | 011 | 100 | 101 | 110 | 111 |
| 000 | 0.00 | 0.50 | 0.25 | 0.75 | 0.00 | 0.50 | 0.25 | 0.75 |
| 001 | 0.25 | 0.75 | 0.00 | 0.50 | 0.25 | 0.75 | 0.00 | 0.50 |
| 010 | 0.75 | 0.00 | 0.50 | 0.25 | 0.75 | 0.00 | 0.50 | 0.25 |
| 011 | 0.50 | 0.25 | 0.75 | 0.00 | 0.50 | 0.25 | 0.75 | 0.00 |
| 100 | 0.00 | 0.50 | 0.25 | 0.75 | 0.00 | 0.50 | 0.25 | 0.75 |
| 101 | 0.25 | 0.75 | 0.00 | 0.50 | 0.25 | 0.75 | 0.00 | 0.50 |
| 110 | 0.75 | 0.00 | 0.50 | 0.25 | 0.75 | 0.00 | 0.50 | 0.25 |
| 111 | 0.50 | 0.25 | 0.75 | 0.00 | 0.50 | 0.25 | 0.75 | 0.00 |

Y (row label)

FIG.35

|   | X | | | | | | | |
|---|---|---|---|---|---|---|---|---|
| | 000 | 001 | 010 | 011 | 100 | 101 | 110 | 111 |
| 000 | 0.00 | 0.625 | 0.50 | 1.125 | 0.50 | 1.125 | 1.00 | 1.625 |
| 001 | 0.25 | 0.875 | 0.25 | 0.875 | 0.75 | 1.375 | 0.75 | 1.375 |
| 010 | 0.75 | 0.125 | 0.75 | 0.625 | 1.25 | 0.625 | 1.25 | 1.125 |
| 011 | 0.50 | 0.375 | 1.00 | 0.375 | 1.00 | 0.875 | 1.50 | 0.875 |
| 100 | 0.00 | 0.625 | 0.50 | 1.125 | 0.50 | 1.125 | 1.00 | 1.625 |
| 101 | 0.25 | 0.875 | 0.25 | 0.875 | 0.75 | 1.375 | 0.75 | 1.375 |
| 110 | 0.75 | 0.125 | 0.75 | 0.625 | 1.25 | 0.625 | 1.25 | 1.125 |
| 111 | 0.50 | 0.375 | 1.00 | 0.375 | 1.00 | 0.875 | 1.50 | 0.875 |

Y (row label)

FIG.36

| | | X | | | | | | | |
|---|---|---|---|---|---|---|---|---|---|
| | | 000 | 001 | 010 | 011 | 100 | 101 | 110 | 111 |
| Y | 000 | 0.000 | 0.000 | 0.000 | 0.000 | 0.000 | 0.000 | 0.000 | 0.000 |
| | 001 | 0.125 | 0.125 | 0.125 | 0.125 | 0.125 | 0.125 | 0.125 | 0.125 |
| | 010 | 0.250 | 0.250 | 0.250 | 0.25 | 0.250 | 0.250 | 0.250 | 0.250 |
| | 011 | 0.375 | 0.375 | 0.375 | 0.375 | 0.375 | 0.375 | 0.375 | 0.375 |
| | 100 | 0.500 | 0.500 | 0.500 | 0.500 | 0.500 | 0.500 | 0.500 | 0.500 |
| | 101 | 0.625 | 0.625 | 0.625 | 0.625 | 0.625 | 0.625 | 0.625 | 0.625 |
| | 110 | 0.750 | 0.750 | 0.750 | 0.750 | 0.750 | 0.750 | 0.750 | 0.750 |
| | 111 | 0.875 | 0.875 | 0.875 | 0.875 | 0.875 | 0.875 | 0.875 | 0.875 |

FIG.37

| | | \multicolumn{8}{c}{X} | | | | | | | |
|---|---|---|---|---|---|---|---|---|---|
| | | 000 | 001 | 010 | 011 | 100 | 101 | 110 | 111 |
| Y | 000 | 0.00 | 0.25 | 0.75 | 0.50 | 0.00 | 0.25 | 0.75 | 0.50 |
| | 001 | 0.50 | 0.75 | 0.00 | 0.25 | 0.50 | 0.75 | 0.00 | 0.25 |
| | 010 | 0.25 | 0.00 | 0.50 | 0.75 | 0.25 | 0.00 | 0.50 | 0.75 |
| | 011 | 0.75 | 0.50 | 0.25 | 0.00 | 0.75 | 0.50 | 0.25 | 0.00 |
| | 100 | 0.00 | 0.25 | 0.75 | 0.50 | 0.00 | 0.25 | 0.75 | 0.50 |
| | 101 | 0.50 | 0.75 | 0.00 | 0.25 | 0.50 | 0.75 | 0.00 | 0.25 |
| | 110 | 0.25 | 0.00 | 0.50 | 0.75 | 0.25 | 0.00 | 0.50 | 0.75 |
| | 111 | 0.75 | 0.50 | 0.25 | 0.00 | 0.75 | 0.50 | 0.25 | 0.00 |

FIG.38

| | | X | | | | | | | |
|---|---|---|---|---|---|---|---|---|---|
| | | 0 0 0 | 0 0 1 | 0 1 0 | 0 1 1 | 1 0 0 | 1 0 1 | 1 1 0 | 1 1 1 |
| Y | 0 0 0 | 0.000 | 0.250 | 0.750 | 0.500 | 0.000 | 0.250 | 0.750 | 0.500 |
| | 0 0 1 | 0.625 | 0.875 | 0.125 | 0.375 | 0.625 | 0.875 | 0.125 | 0.375 |
| | 0 1 0 | 0.500 | 0.250 | 0.750 | 1.000 | 0.500 | 0.250 | 0.750 | 1.000 |
| | 0 1 1 | 1.125 | 0.875 | 0.625 | 0.375 | 1.125 | 0.875 | 0.625 | 0.375 |
| | 1 0 0 | 0.500 | 0.750 | 1.250 | 1.000 | 0.500 | 0.750 | 1.250 | 1.000 |
| | 1 0 1 | 1.125 | 1.375 | 0.625 | 0.875 | 1.125 | 1.375 | 0.625 | 0.875 |
| | 1 1 0 | 1.000 | 0.750 | 1.250 | 1.500 | 1.000 | 0.750 | 1.250 | 1.500 |
| | 1 1 1 | 1.625 | 1.375 | 1.125 | 0.875 | 1.625 | 1.375 | 1.125 | 0.875 |

FIG.39

|  | 000 | 001 | 010 | 011 | 100 | 101 | 110 | 111 |
|---|---|---|---|---|---|---|---|---|
| 000 | 0 | 4 | 2 | 6 | 1 | 5 | 3 | 7 |
| 001 | 1 | 5 | 3 | 7 | 0 | 4 | 2 | 6 |
| 010 | 3 | 7 | 0 | 4 | 2 | 6 | 1 | 5 |
| 011 | 2 | 6 | 1 | 5 | 3 | 7 | 0 | 4 |
| 100 | 7 | 0 | 4 | 2 | 6 | 1 | 5 | 3 |
| 101 | 6 | 1 | 5 | 3 | 7 | 0 | 4 | 2 |
| 110 | 5 | 3 | 7 | 0 | 4 | 2 | 6 | 1 |
| 111 | 4 | 2 | 6 | 1 | 5 | 3 | 7 | 0 |

FIG.44

| S COORDINATE MSB = 0<br>T COORDINATE MSB = 0<br>$A_{00}$ | S COORDINATE MSB = 1<br>T COORDINATE MSB = 0<br>$A_{10}$ |
|---|---|
| S COORDINATE MSB = 0<br>T COORDINATE MSB = 1<br>$A_{01}$ | S COORDINATE MSB = 1<br>T COORDINATE MSB = 1<br>$A_{00}$ |

| R | 7 | 0  | INCREASED AMOUNT=(0-7)/6≒-1.2 |
| G | 2 | 15 | INCREASED AMOUNT=(15-2)/6≒2.2 |
| B | 7 | 13 | INCREASED AMOUNT=(13-7)/6≒1 |

THREE DIMENSIONAL PARALLEL DRAWING APPARATUS FOR SYNTHESIZING GRAPHICS DATA WITH IMAGE DATA USING A PIXEL DEPTH BUFFER AND AN IMAGE DEPTH REGISTER

RELATED APPLICATIONS

This is a division of U.S. application Ser. No. 08/061,087, filed on May 13, 1993, now U.S. Pat. No. 5,586,234 and related to U.S. application Ser. No. 08/460,804, filed on Jun. 2, 1995, now U.S. Pat. No. 5,572,636, and related to U.S. application Ser. No. 08/739,217, filed on Oct. 29, 1996, related to U.S. application Ser. No. 08/741,355, filed on Oct. 29, 1996.

BACKGROUND OF THE INVENTION

The present invention relates to a three-dimensional graphics drawing apparatus for developing image data from three-dimensional polygon information to pixels by computer processes and for displaying the image data and, more particularly, to a 3-dimensional graphics drawing apparatus for performing an expression of a quality feeling by a texture mapping and an image synthesis using an XZ buffer.

Hitherto, there is a texture mapping as a typical method of expressing a quality feeling of 3-dimensional computer graphics. According to the texture mapping, a material feeling of an object can be formed by realizing an image which is obtained by a method whereby a texture pattern such as grain pattern, marble pattern, or the like which has independently been defined is adhered onto the surface of an object having a three-dimensional shape.

Two-dimensional coordinates which are obtained by projecting the surface shape of the 3-dimensional object on which the texture pattern was adhered are now defined as UV surface shape coordinates. Two-dimensional coordinates of a memory in which texture patterns have been stored are defined as ST texture coordinates. Further, two-dimensional coordinates of a frame memory to draw the surface shape on which a texture pattern has been mapped are defined as XY display coordinates. The values of those coordinates are expressed by small letters such as (u, v), (s, t), and (x, y), respectively.

In the texture mapping, it is a problem how to give the correspondence between the XY display coordinates of the frame memory for display and the ST texture coordinates of the texture pattern memory. In the case where the surface shape of a 3-dimensional object on which a texture pattern is adhered is not so geometrically complicated, coordinate values (x, t) of a proper texture pattern are given to each vertex of a polygon having a micro triangular or rectangular shape and the coordinate values which fill the region in the polygon are obtained by a linear interpolation.

The mapping to the frame memory from the memory in which the actual texture patterns have been stored is realized by a method whereby the texture pixel data read out from the texture pattern memory is written as pixel data (color values) which is written to the pixel positions in the frame memory.

In this instance, the reading operation of the texture pixel data from the texture pattern memory is executed by obtaining the coordinate values (s, t) of the ST texture coordinates corresponding to the coordinate values (u, v) of the UV surface shape coordinates of a 3-dimensional object by a linear interpolation. When the texture pixel data read out from the texture pattern memory is drawn into the frame memory, an address is designated by the values (x, y) of the XY display coordinates corresponding to the values (u, v) of the UV surface shape coordinates and the texture pixel data is written in such an address. In this case, as compared with a simple painting, the texture pixel data is read out every pixel from the texture pattern memory and written into the frame memory, so that a problem such that a drawing speed is extremely slow occurs.

To draw a texture pattern at a high speed, it is necessary to execute parallel processes so as to read out and draw a plurality of pixels in a lump. In case of using one texture pattern memory, it takes a time to read out a plurality of pixels. Therefore, the same pattern is stored into a plurality of texture pattern memories and a plurality of pixels are simultaneously read out by a digital signal processor or the like provided for every memory and are drawn. With this method, a high processing speed can be accomplished.

FIG. 1 is a schematic diagram showing a conventional texture mapping mechanism. Texture pattern memories 64-1 and 64-2 are individually provided for drawing processing units 32-1 and 32-2 provided in a 3-dimensional drawing mechanism 22. The same texture pattern is stored into the memories 64-1 and 64-2. The drawing processing units 32-1 and 32-2 read out two texture pixel data (color values) in parallel from the texture pattern memories 64-1 and 64-2 by using ST texture coordinates $(s_1, t_1)$ and $(s_2, t_2)$ obtained by the coordinates transformation and set the read-out texture pixel data into registers 68-1 and 68-2. Two texture pixel data in the registers 68-1 and 68-2 are simultaneously written into a frame memory 34 by the address designation by the XY display coordinate values (x, y). The mapping data of the texture pattern drawn in the frame memory 34 is read out by the address designation by the XY display coordinate values (x, y) and is displayed on a color display 28.

The texture coordinate values (s, t) in the texture pattern memory can be read out by an amount of only one pixel by a single access because addresses are discontinuously formed in dependence on a adhering method of the texture pattern. The frame memory, however, can draw a plurality of pixels at a time since drawing addresses (x, y) are continuous.

In the example of FIG. 1, two sets of digital signal processors and texture pattern memories are provided and image signals are processed in parallel every two pixels at a time. However, actually, about 8 to 64 sets of digital signal processors and texture pattern memories are provided and the parallel processes are executed.

In such a conventional texture mapping mechanism, however, a memory capacity increases in correspondence to the parallel processes. When a memory capacity is limited, therefore, a storage amount of patterns is also limited. Consequently, as the number of kinds of texture patterns increases, it is necessary to process the texture patterns while exchanging them.

In many cases, however, the texture patterns are stored in an external magnetic disk apparatus or the like. A very long time is needed to exchange the patterns as compared with the time which is necessary for the drawing process. There is a problem such that when an amount of texture patterns once reaches an amount such that it is necessary to exchange the patterns, the drawing speed suddenly fairly becomes slow.

In such a conventional texture mapping mechanism, on the other hand, no problem occurs in the case where the texture pixel data read out from the texture pattern memory is used and mapped to the XY display coordinates in the frame memory by a size of about (1:1). In case of enlarging a figure and drawing in the frame memory, however, there is a problem such that the texture pattern is drawn like a block and is unnaturally seen.

The above problems will now specifically be described with reference to FIGS. 2A to 2C. First, as shown in FIG. 2A, as for the texture pattern, for example, (8×8) pixels are set to one unit and the pixel data stored at each coordinate position, namely, the color value is conveniently expressed by "●×▲■". FIG. 2B shows the case of drawing at a rate of (1:1). FIG. 2C shows the case of enlarging and drawing at a rate of (1:4).

In case of drawing at a rate of (1:1) as shown in FIG. 2B, four kinds of colors are mixed and an image is seen as if it were painted in a certain color when it is seen from a far position. The actual pixel on a display corresponds to a micropoint. The mapped texture pattern shown in the diagram is actually seen as a square of about 5 mm. However, as shown in FIG. 2C, in case of enlarging and drawing at a rate of about (1:4), since one texture pixel is magnified to (4×4)=16 pixels, even when it is seen from a far position, it is seen as a block-like rough pattern.

To solve the above problem, hitherto, in case of extremely magnifying, a texture pattern which has previously been magnified is separately prepared and used, thereby preventing that a block-like pattern appears. On the other hand, texture pixel data of the pixels which are arranged upon enlargement is obtained by a linear interpolation of the neighboring texture image data (color values) before enlargement. The color of the pixels arranged for enlargement is smoothly changed, thereby preventing that a block-like shape is seen. To prepare the enlarged texture patterns, however, a texture pattern memory of a large capacity is needed. There are also problems such that it takes a long calculating time to interpolate the color information of the pixel data of the number according to the magnification upon enlargement and that the drawing speed remarkably becomes slow.

On the other hand, the texture pattern memory 34 must be accessed by a drawing control mechanism 18 every interpolating calculation. There are, consequently, problems such that it takes a time to execute the linear interpolating calculation using the UV surface shape coordinates and ST texture coordinates and the mapping processing speed of the texture pattern is remarkably slower than that in case of a simple plain painting.

In the conventional drawing arithmetic operating mechanism, a performance such that a solid object is divided into a number of polygons and is expressed as a set of polygons and the polygons are drawn at a high speed is required.

The polygon is provided as 3-dimensional figure data including 3-dimensional coordinates (x, y, z) indicative of the position of each vertex of, for example, a triangle and color values of the vertexes. The 3-dimensional drawing mechanism develops such polygon vertex information to a set of pixels which are drawn into the frame memory. However, with respect to the polygon which were developed to the pixels, the color values of only the vertex pixels have been decided. Therefore, with respect to the color values of the pixels other than the pixels of the vertexes, the color values calculated by the linear interpolation are used and the pixels are drawn, so that the solid object can be more smoothly expressed.

In the actual calculations to obtain the color value of each pixel by the linear interpolation, a difference between the color value of the start pixel of the scan line which passes through the polygon and the color value of the end pixel is divided by the number of pixels existing between the start point and the end point and a change value per one pixel is obtained. After that, it is sufficient to add the change value to the preceding color value by an adder each time the pixel position is increased from the designated position.

However, since the change value which is used for interpolating calculation has a value below a decimal point, there are problems such that when the pixel position is increased to the final pixel position whose color value has previously been known, the adder causes an overflow or underflow, the color value changes to quite the different color value, and a color which is largely deviated from the inherent color is outputted.

Further, the conventional 3-dimensional graphics drawing apparatus has a hidden image erasing function using a Z buffer when a plurality of images are synthesized. That is, a depth coordinate value (z) of the image having the 3-dimensional coordinates (x, y, z) drawn in a plurality of frame buffers is used. Among the pixel data of a plurality of images existing at the same position, the pixel data of the image existing on this side is set to the effective data and the synthesized image is drawn.

The 3-dimensional frame buffer is constructed by a 2-dimensional frame buffer into which RGB pixel data is written by the address designated by the XY display coordinate values (x, y) and a Z buffer into which the depth coordinate value (z) corresponding to each pixel is likewise written by the address designation by the XY display coordinate values (x, y). A plurality of 3-dimensional frame buffers are provided to synthesize images.

An image synthesizing method in the 3-dimensional graphics apparatus is often used in a simulation or the like in which a plurality of objects move in front of a background image. An image in which a complicated background has previously been completed is prepared as a pattern and is transferred in accordance with a situation and is drawn and used. In this case, a 2-dimensional image such that all of the depth coordinate values (z) are set to the same value is prepared with respect to the background image. In the conventional apparatus, however, even when all of the depth coordinate values (z) are the same on the whole picture plane, they are written into the Z buffer every all of the pixels and the Z buffer of a large capacity is not effectively used.

Further, an expensive graphics workstation is used for a 3-dimensional display of a CAD of the machine system or a CAD of the architecture system. However, in association with the realization of a low price of a workstation, a using method whereby the result of the design can be confirmed as a 3-dimensional image even if a processing speed is slow is requested. A 3-dimensional graphics drawing apparatus of a low price which meets the low-price workstation is demanded.

In the conventional 3-dimensional graphics drawing apparatus installed in the workstation, however, since it has the Z buffer memory to store the depth coordinate value (z), as compared with a 2-dimensional drawing apparatus, the memory capacity increases and the costs rise since the Z buffer memory is additionally used.

To solve such a problem, it is considered that the Z buffer memory is provided in a main storage unit of the CPU. When the Z buffer memory is provided in the main storage unit of the CPU, however, the Z buffer memory is accessed via the bus of the CPU, so that an accessing speed becomes slow and the drawing performance is deteriorated.

SUMMARY OF THE INVENTION

According to the present invention, there is provided a 3-dimensional graphics drawing apparatus in which in the case where a high-speed drawing by texture mapping is needed, a degree of parallel construction is increased, and in the case where the operator wants to handle many texture patterns, a degree of parallel construction is reduced, thereby enabling a texture pattern memory to be efficiently used.

A texture mapping mechanism of the present invention has: a texture pattern memory in which a texture pattern consisting of a set of texture pixel data has been stored in the address which is designated by the coordinate values (s, t) of 2-dimensional ST texture coordinates and a frame memory which has 2-dimensional XY display coordinates corresponding to the display screen and in which a 2-dimensional image of a surface shape of a 3-dimensional object drawn by the texture pixel data is stored.

The invention also has a drawing arithmetic operating mechanism which is constructed in a manner such that coordinate values (u, v) of a 2-dimensional UV surface shape to which the surface shape in the case where a texture pattern is adhered to a 3-dimensional object defined by a set of polygons is projected are produced, the coordinate values (u, v) of the UV surface shape are converted into coordinate values (s, t) of ST texture coordinates in a texture pattern memory, corresponding texture pixel data is read out, and 2-dimensional coordinates (x, y) for display corresponding to the coordinate values (u, v) of the UV surface shape are designated and written into the frame memory.

With respect to such a texture mapping mechanism, according to the present invention, a plurality of sets of texture pattern memory and drawing arithmetic operating mechanism are provided, and a parallel processing mode and a time-division processing mode can be switched.

In the parallel processing mode, there is executed a high-speed parallel mapping such that the same texture pattern is stored into a plurality of texture pattern memories and the texture pixel data at different coordinate positions is read out from the self texture pattern memory and is simultaneously written into the frame memory by a single access by a plurality of mapping drawing mechanism of each set.

In the time-division processing mode, there is executed a time-division mapping such that different kinds of texture patterns are stored into a plurality of texture pattern memories, either one of the plurality of texture pattern memories is selected, and the texture pixel data is sequentially read out and written into the frame memory by the drawing arithmetic operating mechanism of each set.

In the time-division mapping, in the case where a change in texture pattern is instructed, it is sufficient to merely select another texture pattern memory in which the instructed texture pattern has already been stored. Therefore, there is no need to exchange the texture pattern from an external hard disc or the like. Even when the texture pattern is exchanged during the process, the drawing speed is not so largely decreased.

As mentioned above, by executing the parallel processes such that the same pattern is stored into a plurality of texture pattern memories and is simultaneously mapped by a plurality of drawing arithmetic operating mechanisms, the drawing operations can be performed at a high speed. On the other hand, in case of the time-division processes such that different patterns are stored into a plurality of texture pattern memories and either one of them is selected and the same memory is sequentially accessed by a plurality of drawing arithmetic operating mechanisms in a time-divisional manner and the drawing operation is executed, although the drawing speed is slow, there is no need to exchange the texture pattern from the outside, and the image can be drawn at an extremely higher speed than that in case of exchanging the pattern.

According to the invention, there is provided a 3-dimensional graphics drawing apparatus in which even when a texture pattern is enlarged and drawn, a block noise can be made inconspicuous by a simple process.

According to a texture mapping mechanism of the present invention, on the basis of the vertex coordinate values (u, v) of a polygon constructing the surface shape in the case where a 2-dimensional texture pattern is adhered to a 3-dimensional object defined by a set of polygons and the vertex coordinate values (s, t) of the ST texture coordinates corresponding to the vertex coordinate values (u, v), initial values ($s_0$, $t_0$) which are used in the coordinate conversion from the UV surface shape coordinates to the ST texture coordinates and increased amount values ($K_1$, $K_2$) are produced and supplied to the drawing arithmetic operating mechanism, thereby converting into the address coordinates for texture access.

A calculating section of texture S coordinates includes: an S coordinate register to hold an S coordinate initial value ($s_0$) of the ST texture coordinates; an S coordinate increased amount register to hold the S coordinates increased amount value ($K_1$) of the ST texture coordinates; and an S coordinate adder for adding the S coordinate initial value ($s_0$) and the S coordinate increased amount value ($K_1$) each time the UV surface shape coordinate value (u) between the vertexes of the polygon is inputted and for allowing the result of the addition to be held into the S coordinate register as new S coordinate values.

A calculating section of the texture T coordinates includes: a T coordinate register to hold a T coordinate initial value ($t_0$) of the ST texture coordinates; a T coordinate increased amount register to hold a T coordinate increased amount value ($K_2$) of the ST texture coordinates; and a T coordinate adder for adding the T coordinate initial value ($t_0$) and the T coordinate increased amount value ($K_2$) each time the UV surface shape coordinate value (v) between the vertexes of a polygon is inputted and for allowing the result of the addition to be held into the T coordinate register as a new T coordinate value.

With respect to such a calculating mechanism, for the purpose of the texture mapping upon enlargement drawing, the S coordinate calculating section further includes: an S coordinate variation selecting circuit for generating a variation value ($\Delta s$) which is designated by the coordinate values (x, y) of the XY display coordinates corresponding to the coordinate values (u, v) of the UV surface shape coordinates when the enlarging mode is set; and an adding circuit for adding the variation value ($\Delta s$) of the S coordinate variation selecting circuit to the coordinate value (s) from the S coordinate register and for supplying the result of the addition to the texture pattern memory.

Similarly, the T coordinate calculating section further includes: a T coordinate variation selecting circuit for generating a variation value ($\Delta t$) which is designated by the coordinate values (x, y) of the XY display coordinates corresponding to the coordinate values (u, v) of the UV surface shape coordinates when the enlaring mode is set; and an adding circuit for adding the variation value ($\Delta t$) of the T coordinate variation selecting circuit to the coordinate value T from the T coordinate register and for supplying the result of the addition to the texture pattern memory.

By the random additions of the variation values Δs and Δt as mentioned above, a plurality of texture pixel data (color values) which are used to enlarge and draw one pixel are read out from the distributed positions exceeding the enlarged rectangular region, so that the block-like boundary becomes inconspicuous.

When setting the enlarging mode in which the coordinate values (u, v) of the UV surface shape coordinates are enlarged to the XY display coordinates at a rate of (1:N) and are drawn, the increased amount values ($K_1$, $K_2$) are set into 1/N and the coordinate values (s, t) of the same ST texture coordinates are continuously generated each time the coordinate values (u, v) of N continuous UV surface shape coordinates are inputted.

For example, when setting the enlarging mode in which the coordinate values (u, v) of the UV surface shape coordinates which corresponds to the coordinate values (s, t) of the ST texture coordinates in a one-to-one corresponding manner are enlarged four times and developed into the XY display coordinates, the increased amount values ($K_1$, $K_2$) are set into 0.25 of ¼ and are increased as follows.

$$0.00 \rightarrow 0.25 \rightarrow 0.50 \rightarrow 0.75 \rightarrow 1.00 \ldots$$

Since the drawing operation is executed on a pixel unit basis here, only an integer number of coordinate values of the ST texture coordinates exist. Therefore, all of the coordinate values 0.00 to 0.75 are set to 0 by rounding into the integer. Therefore, the texture pixel data read out from the position of the same ST texture coordinates is mapped to four pixels and the pixel can be drawn in the large size of four times.

The S coordinate variation selecting circuit and the T coordinate variation selecting circuit have the folowing tables. Namely, when setting the enlarging mode for enlarging the coordinate values (u, v) of the UV surface shape coordinates to the values of N times and developing to the XY display coordinates, N kinds of variation values from 0 to (N−1)·($K_1$/N) and (N−1)·($K_2$/N) which increase every increased amount values of ($K_1$/N) and ($K_2$/N), as units, which are obtained by dividing the increased amounts ($K_1$, $K_2$) into 1/N have been stored at random in the tables at the positions which are designated by the coordinate values (x, y) of the XY display coordinates. Such tables are prepared in the above selecting circuits. Upon mapping, the tables are searched by the coordinate values (x, y) of the XY display coordinates, thereby selecting the corresponding variation values (Δs, Δt).

For example, when the enlarging mode of four times is set, four kinds of variation values 0.00, 0.25, 0.50, and 0.75 which increase on a unit basis of the increased amount value of 0.25 are obtained and stored at random in tables at the positions which are designated by lower two bits of the coordinate values (x, y) of the XY display coordinates, thereby preparing the tables. Upon mapping, the tables are searched by the lower two bits of the coordinate values (x, y) of the XY display coordinates, thereby selecting the corresponding variation values.

As mentioned above, when the texture pattern is enlarged and drawn, by distributing the ST texture coordinates such that the variation values selected by the XY display coordinates which are used to write into the frame memory are added and the result of the addition is read, the block-like boundary when the pattern is enlarged and drawn can be made inconspicuous.

According to the present invention, as a memory device which can process the mapping of a texture pattern at a high speed, the memory device having the interpolation calculating mechanism of the coordinate conversion therein is provided. Therefore, the memory access for the interpolating calculation by the drawing arithmetic operating mechanism becomes unnecessary. When the UV surface coordinate values (u, v) are supplied to the memory device, the texture pixel data which was read by the interpolation calculated ST texture coordinate values (s, t) can be obtained.

There is also no need to provide any interpolation calculating mechanism for the digital signal processors or the like constructing the drawing arithmetic operating mechanism. A load of the digital signal processor can be reduced. As an interpolation calculating mechanism which is built in the memory device, it is possible to use the same interpolation calculating mechanism as that provided for the drawing arithmetic operating mechanism.

Further, it is also possible to provide: an S coordinate control register in which the upper bits of the coordinate value s which is added and outputted by the S coordinate adder are fixed to the upper bits of the initial value $s_0$ set in the S coordinate register, thereby limiting a conversion coordinate region; and a T coordinate control register in which the upper bits of the coordinate value t which is added and outputted by the T coordinate adder is fixed to the upper bits of the initial value $t_0$ set in the T coordinate register, thereby limiting the conversion coordinate region.

By fixing the upper bits of the output of the adder to the upper bits of the initial values $s_0$ and $t_0$ by the above control registers, only the lower bits of the coordinate values (s, t) change due to the interpolating calculation and the texture pattern can be repeatedly read out while limiting to the rectangular region that is determined by the fixed upper bits.

Further, according to the invention, there is provided a 3-dimensional graphics drawing apparatus which can absorb errors and can accurately execute interpolating calculations without raising a calculating precision by increasing the number of bits of an adder which is used for the interpolating calculation.

The drawing arithmetic operating mechanism of the invention has an interpolation arithmetic operating mechanism for arithmetically operating a color value of each pixel between vertexes by a fixed bit length by the linear interpolation on the basis of the color values of two vertexes of a polygon which expresses a 3-dimensional object. The interpolation arithmetic operating mechanism obtains the change value by dividing the difference between the pixel values of the vertexes by the number of pixels between two vertexes, and each time the pixel position is increased while setting the color value of one of the two vertexes to an initial value, the change values are added by the adder and the color value of each pixel is obtained.

The color value added by the adder has a value below the decimal point. Therefore, there is a case where the adder causes an overflow or underflow at the final pixel position. When the color value of the final pixel obtained by the adder causes an underflow, accordingly, smaller one of the color values of the pixels of two vertexes is selected as a minimum value and is fixedly generated. On the other hand, when the color value of the final pixel obtained by the adder overflows, larger one of the color values of the pixels of two vertexes is selected as a maximum value and is fixedly generated.

Due to this, a situation such that the color value of the pixel at the final position to draw the polygon is quite.. different from the color value to be inherently calculated is eliminated. An arithmetic operating precision can be raised without increasing the number of bits of the adder.

According to the invention, there is provided a 3-dimensional graphics drawing apparatus which can effectively use a Z buffer to another application when a background image or the like in which depth coordinate values are equal on a whole picture plane is stored into a 3-dimensional frame buffer. In addition to the 2-dimensional frame buffer to draw pixel data and the Z buffer, the Z register to write a single depth coordinate value z is provided for the 3-dimensional frame buffer. Upon drawing in the case where the depth coordinate values are equal on the whole picture plane, namely, with respect to all of the pixels as in case of a background image, the depth coordinate value (z) is written into the Z register without using the Z buffer. Therefore, the pattern can be drawn at a high speed by only a speed corresponding to that there is no need to write into the Z buffer. For example, by developing another background image which will be used for the synthesis of the next picture plane into the work buffer, a switching display of the background image to a change in scene can be performed at a high speed.

According to the invention, there is provided a 3-dimensional graphics drawing apparatus which doesn't deteriorate the drawing performance even when the costs are reduced by arranging the Z buffer into the main storage unit. The 3-dimensional graphics drawing apparatus comprises: a 3-dimensional drawing mechanism having a main bus and a local bus; a CPU to supply 3-dimensional drawing data (x, y, and z pixel coordinates and pixel color values) to the 3-dimensional drawing mechanism through the main bus; a main storage control unit to which an access from the CPU by the main bus and an access from the 3-dimensional drawing mechanism by the local bus are selectively performed; and a main storage unit in which in addition to information that is handled by the CPU, drawing information which is handled by the 3-dimensional drawing mechanism is stored into a predetermined area which has previously been allocated.

The 3-dimensional drawing mechanism designates the storage area of the drawing information allocated in the main storage unit and writes depth information (z value) of a 3-dimensional image on a picture plane unit basis. When a plurality of 3-dimensional image information are synthesized, the depth control mechanism reads out the depth information from the main storage unit and compares and selects and draws the image information locating on this side which is nearest.

The depth control mechanism has an address register in which the offset address for designating the head position of the memory area of the drawing information which was allocated in the main storage device is stored as an upper address and an X address and a Y address in the frame memory indicative of the drawing position that is designated by the 2-dimensional display coordinates are stored as lower addresses. The main storage unit can be directly accessed through the local bus by using the memory addresses of the address register.

As mentioned above, even when the Z buffer is arranged on the main storage unit and the costs are reduced by providing the special high-speed bus as a local bus between the 3-dimensional drawing mechanism and the main storage control apparatus and thereby enabling the Z buffer area in the main storage unit to be directly accessed, the drawing process can be performed at a high speed.

On the other hand, an offset address register to designate the start position of the Z buffer area in the main storage unit is provided for the depth control section of the 3-dimensional drawing mechanism, thereby enabling the Z buffer area to be set at an arbitrary position in the main storage unit. Due to this, the use efficiency of the memory is raised.

Consequently, the Z buffer memory is made unnecessary and the costs of the drawing mechanism can be reduced without deteriorating the performance of the 3-dimensional drawing mechanism.

The above objects, features, and advantages of the present invention will become more apparent from the following detailed description with reference to the drawings.

BRIEF DESCRIPTION OF THE DRAWINGS

Figures 2A, 2B, 2C:
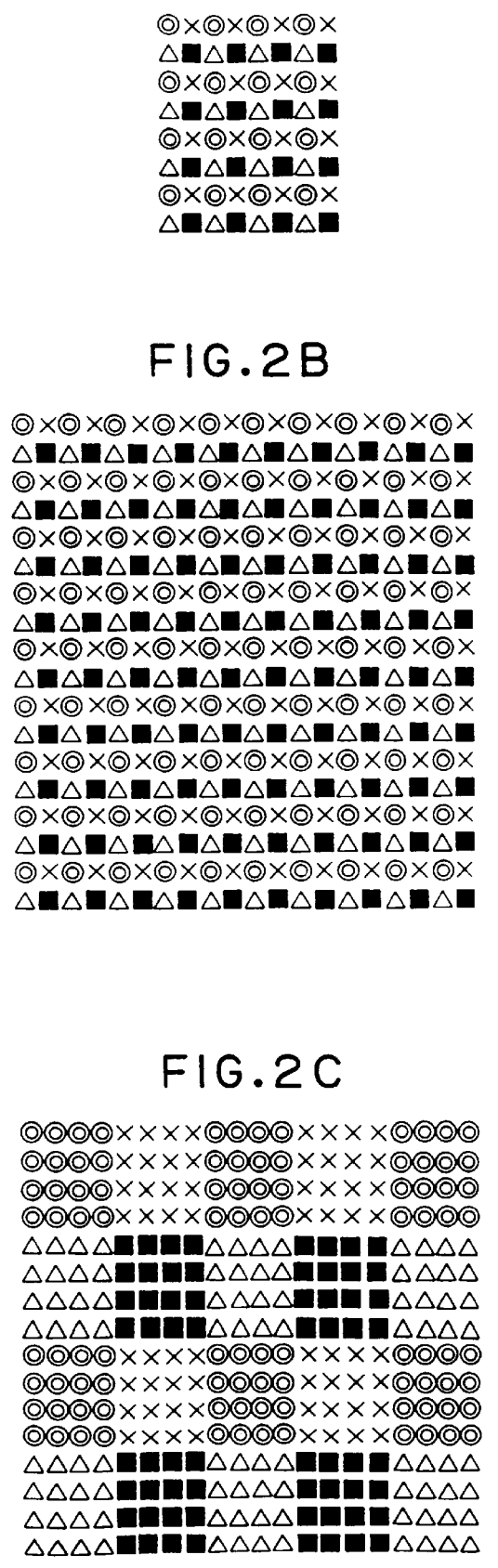

FIG. 2A is an explanatory diagram of a storage pattern in a texture pattern memory;

FIG. 2B is a drawing explanatory diagram of a texture pattern drawn at a rate of (1:1);

FIG. 2C is an explanatory diagram of a texture pattern which was enlargedly drawn at a rate of (1:4);

FIG. 20 is an explanatory diagram showing numerical values of the coordinate transformation in FIG. 19 in a lump;

FIG. 21 is an explanatory diagram of polygon command data which is used in the texture mapping;

FIG. 24 is an explanatory diagram of S coordinatte values of a mapping pattern which change in accordance with lower two bits of the XY display coordinate values when a pattern is enlargedly drawn at a rate of (1:4);

FIG. 25 is an explanatory diagram of S coordinate variation values which change in accordance with lower two bits of the XY display coordinate values when a pattern is enlargedly drawn at a rate of (1:4);

FIG. 26 is an explanatory diagram showing the result of the addition of the S coordinate values in FIG. 24 and the S coordinate variation values in FIG. 25;

FIG. 27 is an explanatory diagram of T coordinate values of a mapping pattern which change in accordance with lower two bits of the XY display coordinate values when a pattern is enlargedly drawn at a rate of (1:4);

FIG. 28 is an explanatory diagram of T coordinate variation values which change in accordance with lower two bits of the XY display coordinate values when a pattern is enlargedly drawn at a rate of (1:4);

FIG. 29 is an explanatory diagram showing the result of the addition of the T coordinate values in FIG. 27 and the T coordinate variation values in FIG. 28;

FIG. 31 is an explanatory diagram of a texture pattern drawn at a rate of (1:4) without adding the variation values;

FIG. 32 is an explanatory diagram of a texture pattern drawn at a rate of (1:4) by adding the variation values;

FIG. 33 is an explanatory diagram of S coordinate values of a mapping pattern which change in accordance with lower three bits of the XY display coordinate values when a pattern is enlargedly drawn at a rate of (1:8);

FIG. 34 is an explanatory diagram of S coordinate variation values which change in accordance with lower three bits of the XY display coordinate values when a pattern is enlargedly drawn at a rate of (1:8);

FIG. 35 is an explanatory diagram showing the result of the addition of the S coordinate values in FIG. 33 and the S coordinate variation values in FIG. 34;

FIG. 36 is an explanatory diagram of T coordinate values of a mapping pattern which change in accordance with lower three bits of the XY display coordinate values when a pattern is enlargedly drawn at a rate of (1:8);

FIG. 37 is an explanatory diagram of T coordinate variation values which change in accordance with lower three bits of the XY display coordinate values when a pattern is enlargedly drawn at a rate of (1:8);

FIG. 38 is an explanatory diagram showing the result of the addition of the T coordinate values in FIG. 36 and the T coordinate variation values in FIG. 37;

FIG. 39 is an explanatory diagram showing the orders of the table arrangement of the variation values which are used when a pattern is enlargedly drawn at a rate of (1:8);

FIG. 44 is an explanatory diagram showing an access range of ST texture coordinates in the second embodiment of FIG. 43;

FIGS. 46A to 46C are explanatory diagrams showing the practical calculating operations of the interpolation calculating mechanism in FIG. 45;

DETAILED DESCRIPTION OF THE PREFERRED EMBODIMENT

System Construction

Figure 1:
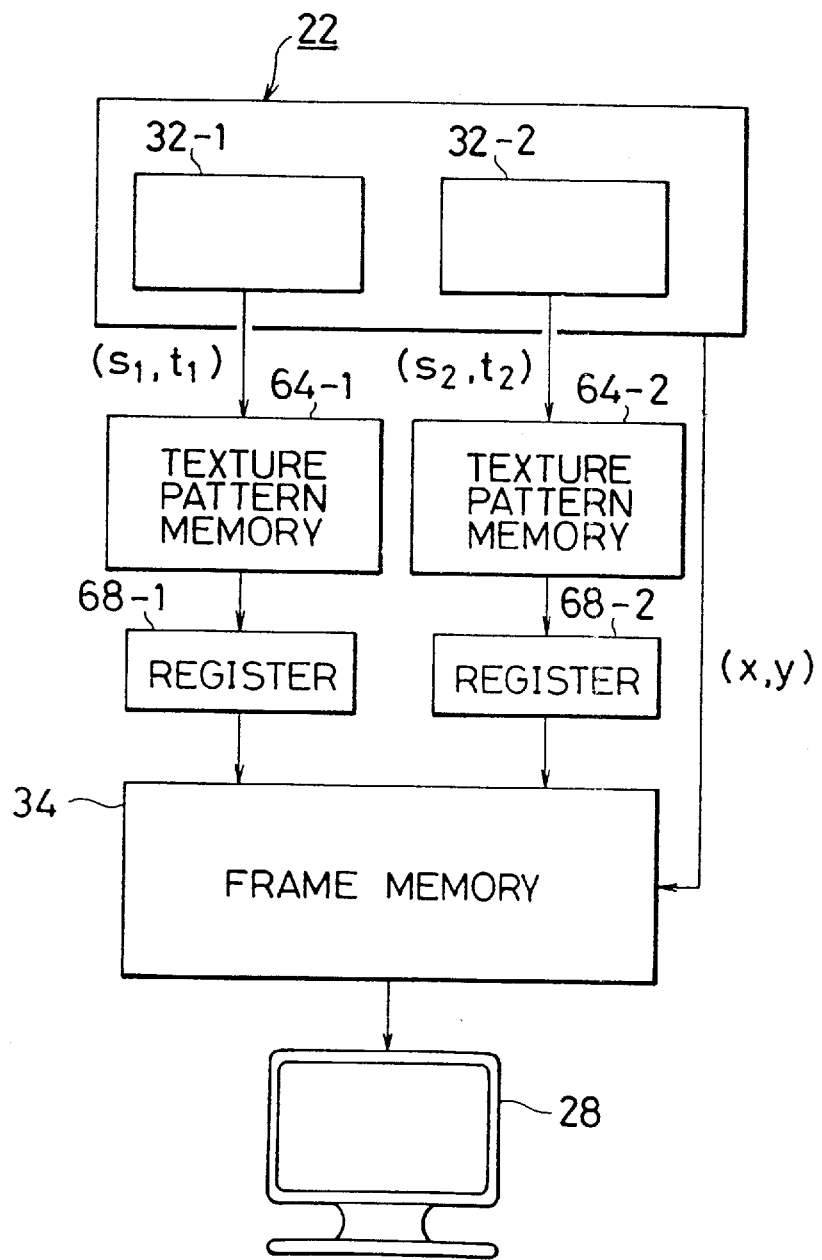
FIG. 1 is a schematic explanatory diagram of a conventional texture mapping mechanism.
Figure 3:
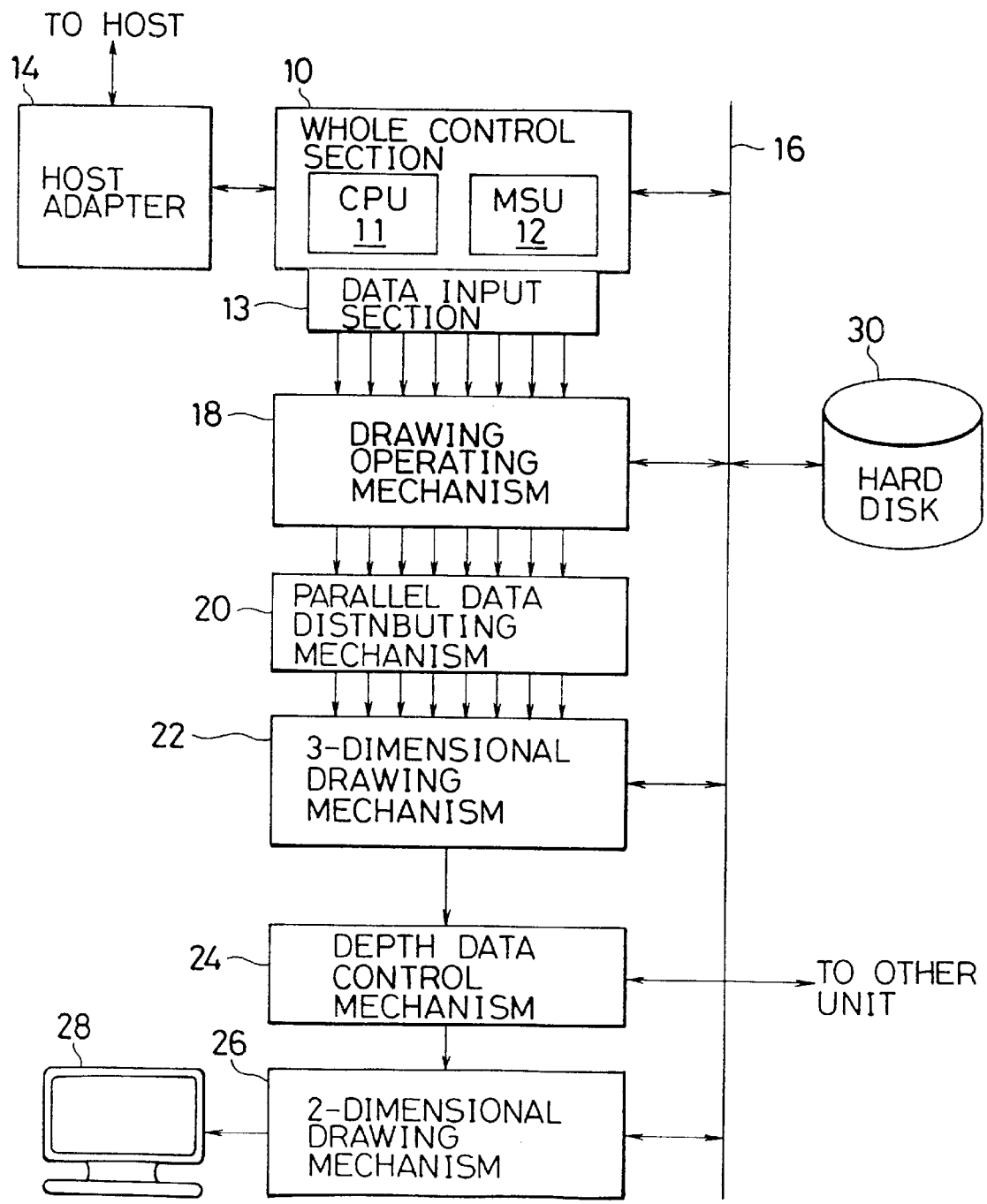
FIG. 3 is an explanatory diagram showing a whole construction of the present invention.

FIG. 3 is a block diagram showing a construction of one unit of a 3-dimensional graphics drawing apparatus of the present invention. A plurality of such units are provided as necessary. A CPU 11 and a main storage unit (MSU) 12 are provided in a whole control section 10. The whole control section 10 is connected to a host computer through a host adapter 14. A drawing command and figure data indicative of a 3-dimensional object are supplied from the host computer to the whole control section 10 through the host adapter 14. The CPU 11 of the whole control section 10 executes the management of the drawing data and the window control on the basis of host commands. It is desirable to provide two CPU 11 in order to realize the drawing management and the window control by parallel processes.

Subsequent to the whole control section 10, a drawing operating mechanism 18 is provided through a data input section 13. In the embodiment, the drawing operating mechanism 18 has 32 digital signal processors therein and receives data by the data input section using the FIFO (First-in First-out) coupling and constructs 8-parallel pipelines or a 5-dimensional hypercube by the mutual communicating functions which the digital signal processors have, thereby executing arithmetic operating processes in parallel. As drawing arithmetic operations of the drawing operating mechanism 18, calculations of the coordinate transformation of the coordinates of the vertexes of a polygon given as 3-dimensional data and calculations to decide the color values of the vertex pixels are executed. The result of the drawing operating mechanism 18 is sent to the 3-dimensional drawing mechanism 22 through a parallel data distributing mechanism 20. The parallel data distributing mechanism 20 efficiently distributes the asynchronous data produced by the 8-parallel pipelines of the drawing operating mechanism 18 to the 3-dimensional drawing mechanism 22 at the next stage. Specifically speaking, the FIFO coupling is used.

The 3-dimensional drawing mechanism 22 receives the 3-dimensional image data which was developed to the vertex pixels of the polygon from the drawing operating mechanism 18 and obtains the pixels to bury the portion between the vertexes of the polygon by interpolating calculations. Further, the blending, mapping, hidden image erasure, and the like of each pixel are executed by the firmware and a pattern is drawn in a 3-dimensional frame memory. The data drawn in the 3-dimensional frame memory of the 3-dimensional drawing mechanism 22 is automatically transferred to a 2-dimensional drawing mechanism 26 through a depth data control mechanism 24 and displayed as 2-dimensional image data by the color display 28.

Further, the drawing operating mechanism 18, 3-dimensional drawing mechanism 22, and 2-dimensional drawing mechanism 26 are connected to the whole control section 10 through a system bus 16 and the drawing data is managed by the whole control section 10. The window control of the 2-dimensional drawing mechanism 26 is directly performed by the whole control section 10. A hard disc 30 is connected to the system bus 16. For example, a plurality of kinds of texture patterns which are used for texture mapping of the drawing operating mechanism 18 have previously been stored on the hard disc 30. A necessary texture pattern is read out from the hard disc 30 under control by the whole control section 10 and can be stored into a texture pattern memory using a part of the frame memory of the 3-dimensional drawing mechanism 22. In a manner similar to the above, the mapping data other than the texture mapping is also transferred from the hard disc 30 to the frame memory of the 3-dimensional drawing mechanism 22 and can be used for the drawing arithmetic operation.

Figure 4:
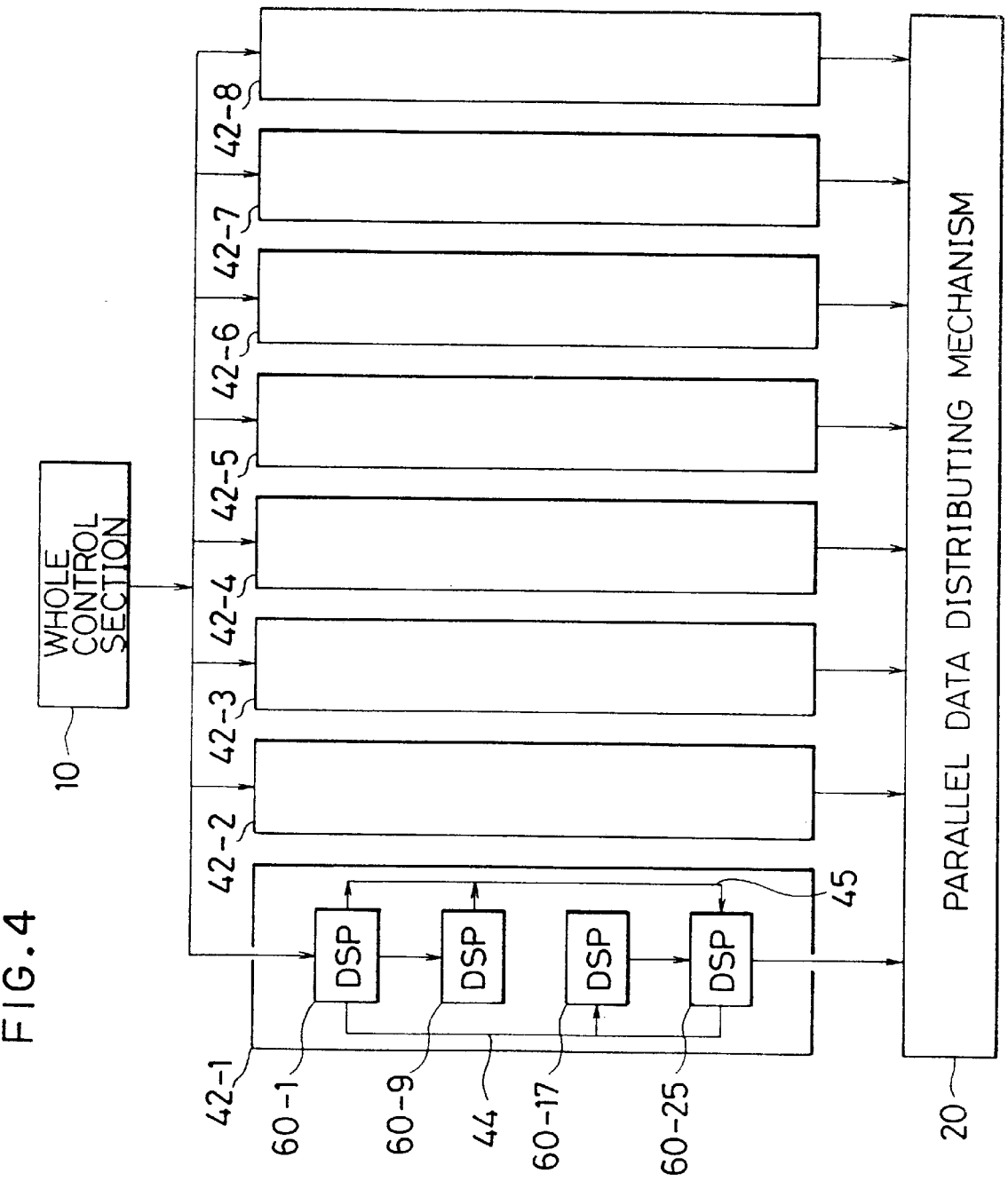
FIG. 4 is a block diagram of an embodiment of a drawing arithmetic operating mechanism in FIG. 3.

FIG. 4 is a block diagram of an embodiment of the drawing operating mechanism 18 in FIG. 3. In FIG. 4, the drawing operating mechanism uses 32 digital signal processors 60-1 to 60-32 and construct eight pipelines 42-1 to 42-8 each having a 4-stage construction as shown in the diagram and executes high-speed drawing arithmetic operations. As typically shown with respect to the pipeline 42-1, the pipeline structure has four digital signal processors 60-1, 60-9, 60-17, and 60-25. The first digital signal processor (DSP) 60-1 executes the coordinate transformation of the polygon vertexes and the development to the pixel data to obtain the color values of te polygon vertexes with respect to 3-dimensional figure data expressed by a set of polygons. The coordinate transforming calculation to the texture coordinates for texture mapping is included in the coordinate transformation of the polygon vertex. The digital signal processor 60-9 at the second stage executes a shadow mapping using a shadow map which has previously been formed by setting a visual point to a light source. The digital signal processor 60-17 at the third stage executes a bump mapping using a bump map of eight bits or twenty-four bits per one pixel. Further, the digital signal processor 60-25 at the fourth stage executes a reflection mapping using three kinds of reflection maps of the semispherical type, full spherical type, and cubic type.

Figure 5:
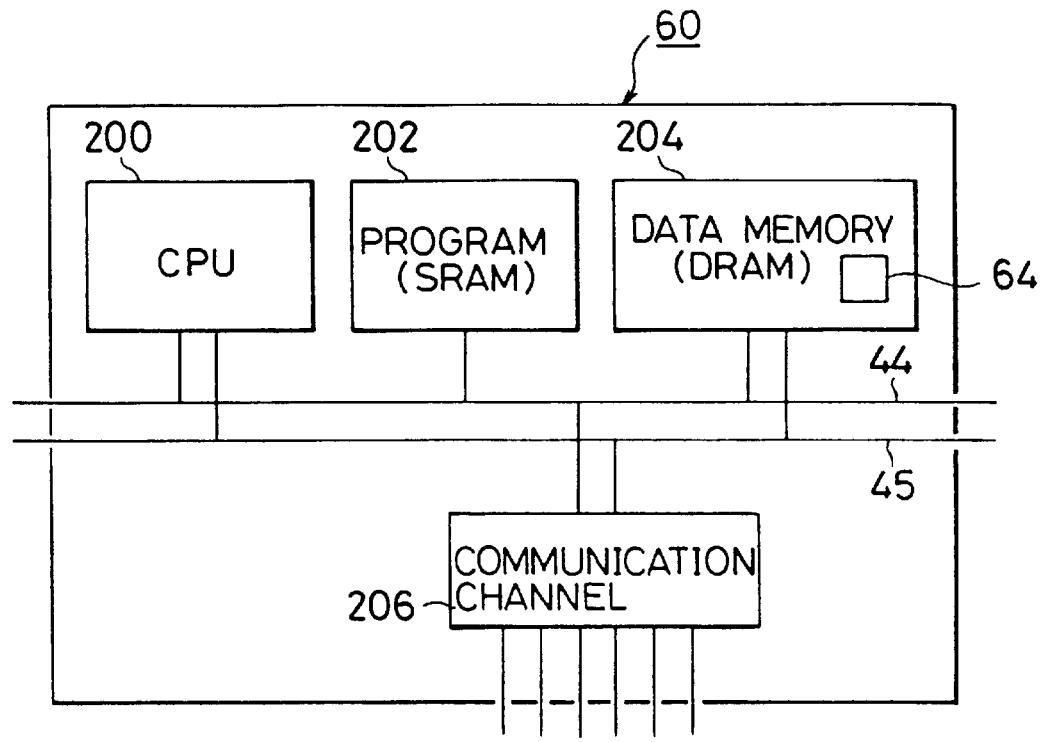
FIG. 5 is a block diagram showing the details of a digital signal processor in FIG. 4.

For example, a processor TM320C40 of TI Co., Ltd. can be used as a digital signal processor which is used for the pipelines 42-1 to 42-8. As shown in FIG. 5, such a digital signal processor has a CPU 200, a program memory 202 using an SRAM, a data memory 204 using a DRAM of 4 Mbytes, and a communication channel 206 of six channels having a communicating function with a direct memory access (DMA).

Further, the digital signal processor has a local bus 44 and a grobal buss 45 which can independently be accessed. As shown in the pipeline 42-1 in FIG. 4, the local bus 44 is used to distribute and transfer the 3-dimensional figure data to the digital signal processor at each stage from the whole control section 10. On the other hand, the global bus 45 is used to transfer the result of the arithmetic operation of the digital signal processor at each stage. Further, the 32 digital signal processors can be coupled by a 5-dimensional hypercube by using five channels in the communication channel 206 shown in FIG. 5.

Figure 6:
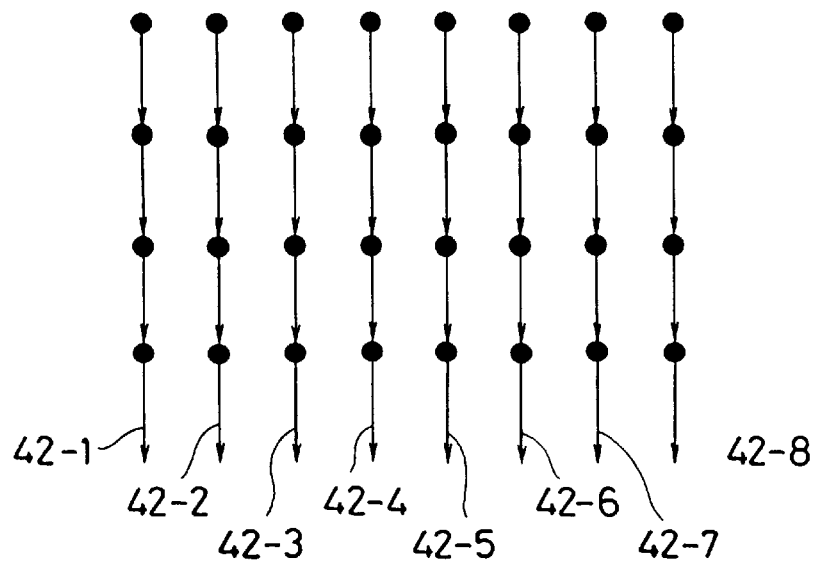
FIG. 6 is an explanatory diagram of eight parallel pipelines which are realized by the drawing arithmetic operating mechanism in FIG. 3.
Figure 7:
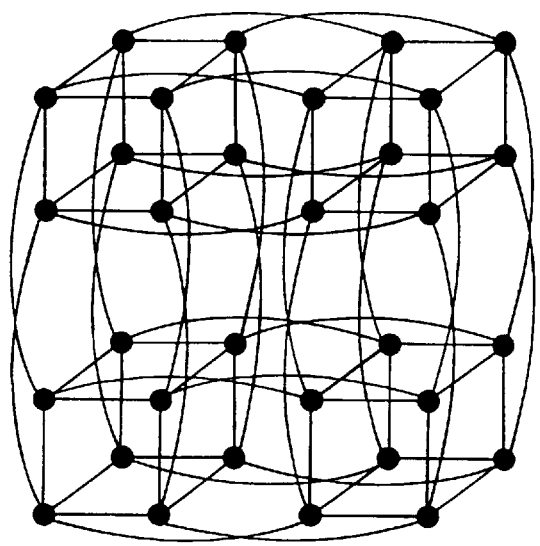
FIG. 7 is an explanatory diagram of a 5-dimensional hypercube which is realized by the drawing arithmetic operating mechanism in FIG. 3.

FIG. 6 is a schematic diagram showing the 8-parallel pipelines 42-1 to 42-8 which are realized by the drawing operating mechanism in FIG. 4. Black dots indicate thirty-two digital signal processors. FIG. 7 is a schematic diagram showing a 5-dimensional hypercube which is used for the full point communication among all of the digital signal processors by using the communication chanels of the digital signal processors.

Figure 8:
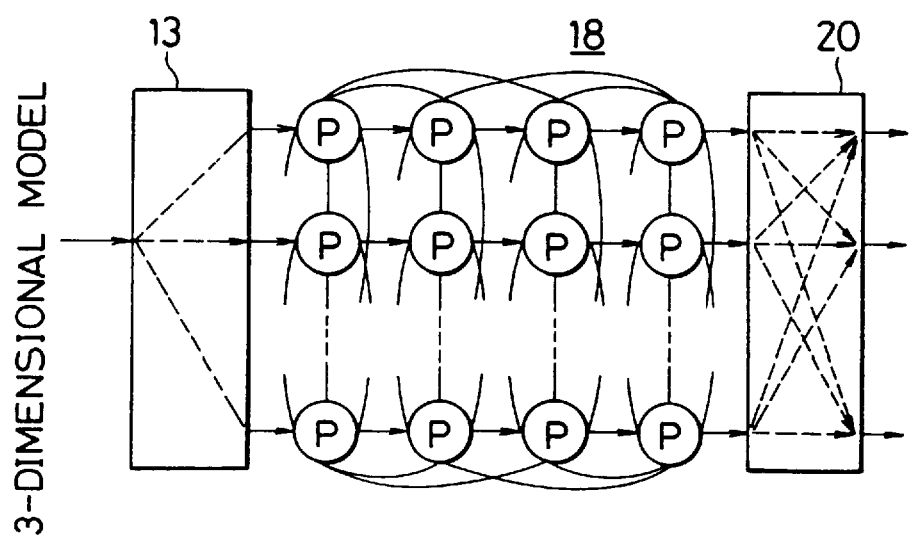
FIG. 8 is an explanatory diagram of an arithmetic operating function of the drawing arithmetic operating mechanism in FIG. 3.
Figure 32:
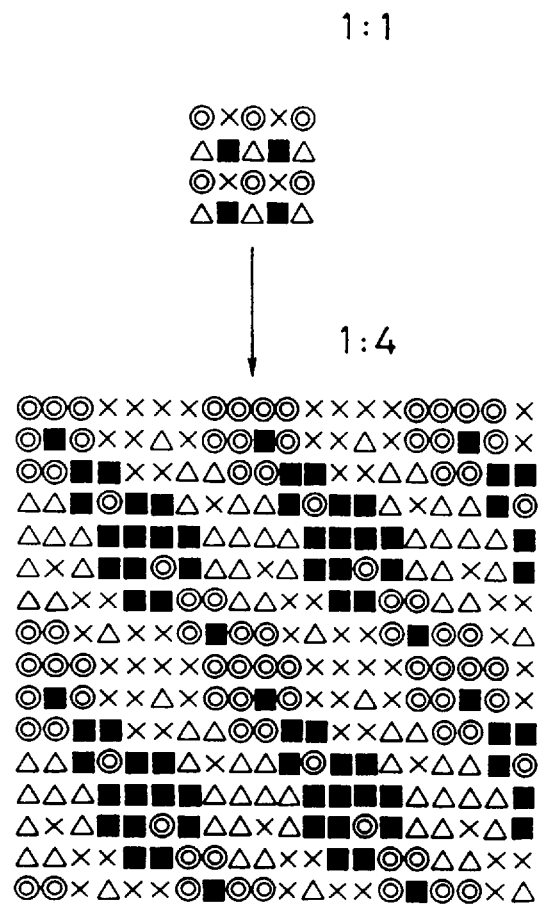

FIG. 8 is an explanatory diagram showing a parallel arithmetic operating function in the drawing operating mechanism in FIG. 4 and 32 digital signal processors are shown as processor kernels P. FIG. 8 shows a state in which the processor kernels are simultaneously coupled by the parallel pipelines in FIG. 6 and the 5-dimensional hypercube network in FIG. 7. In the drawing arithmetic operation in FIG. 8, a 3-dimensional model as a drawing target provided from the host computer is interpreted by a traverser which is executed by the whole control section 10 and is sent to the drawing operating mechanism 18 by designating the pipeline. The data input section 13 selectively inputs data in accordance with the designation of the pipeline and supplies to each pipeline of the drawing operating mechanism 18.

In each pipeline, the processes for the coordinate transformation of each polygon vertex, geometrical coordinate transformation such as clipping, writing, or the like, and calculation of spin parameters to decide the color value of the vertex pixel are executed and the result is sent to the data distributing mechanism 20. The data distributing mechanism 20 executes a distributing process to the 3-dimensional drawing mechanism which is constructed in correspondence to the span according to the Y coordinate value of the result of the arithmetic operation.

Figure 9:
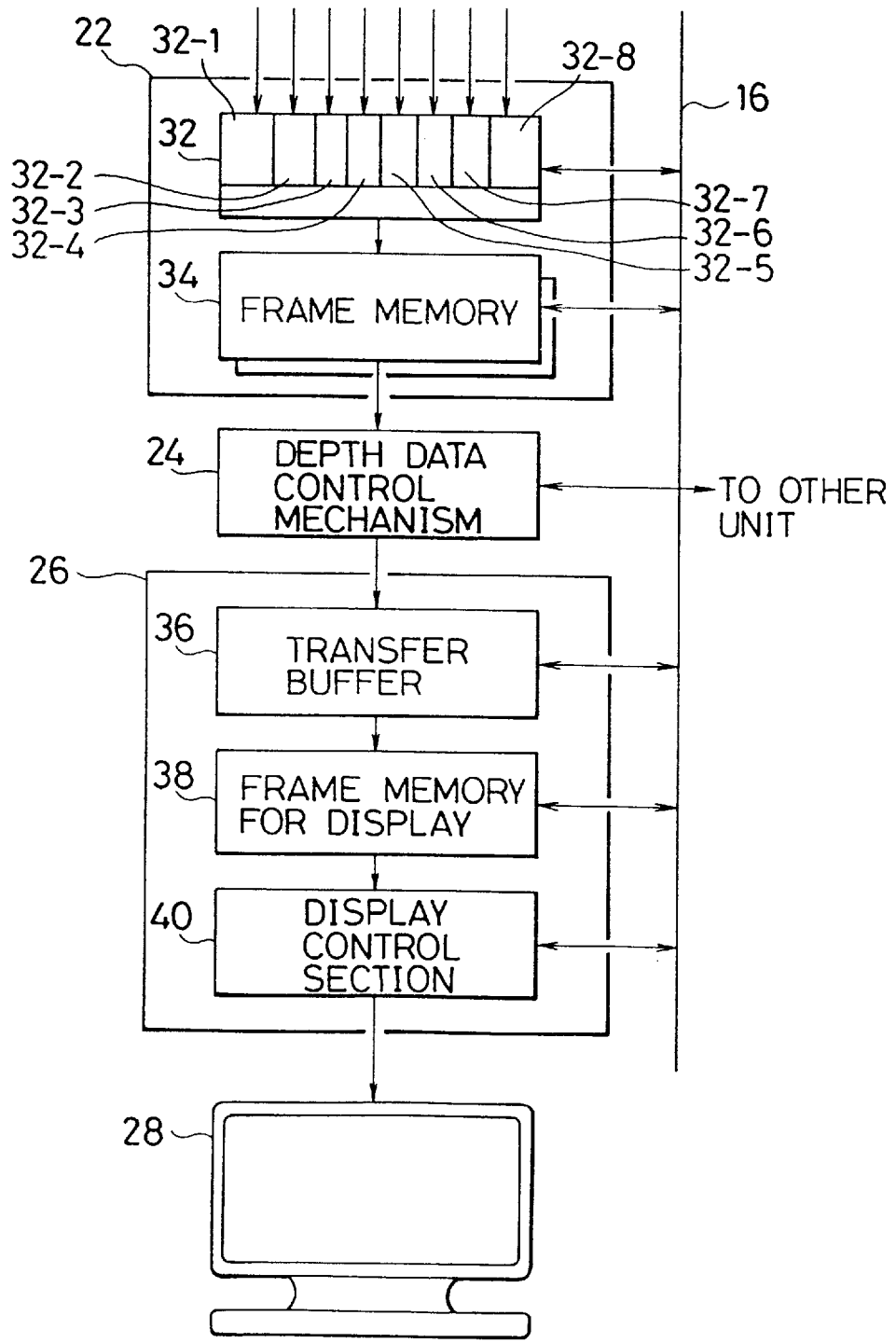
FIG. 9 is a block diagram of a 3-dimensional drawing mechanism and a 2-dimensional drawing mechanism in FIG. 3.
Figure 10:
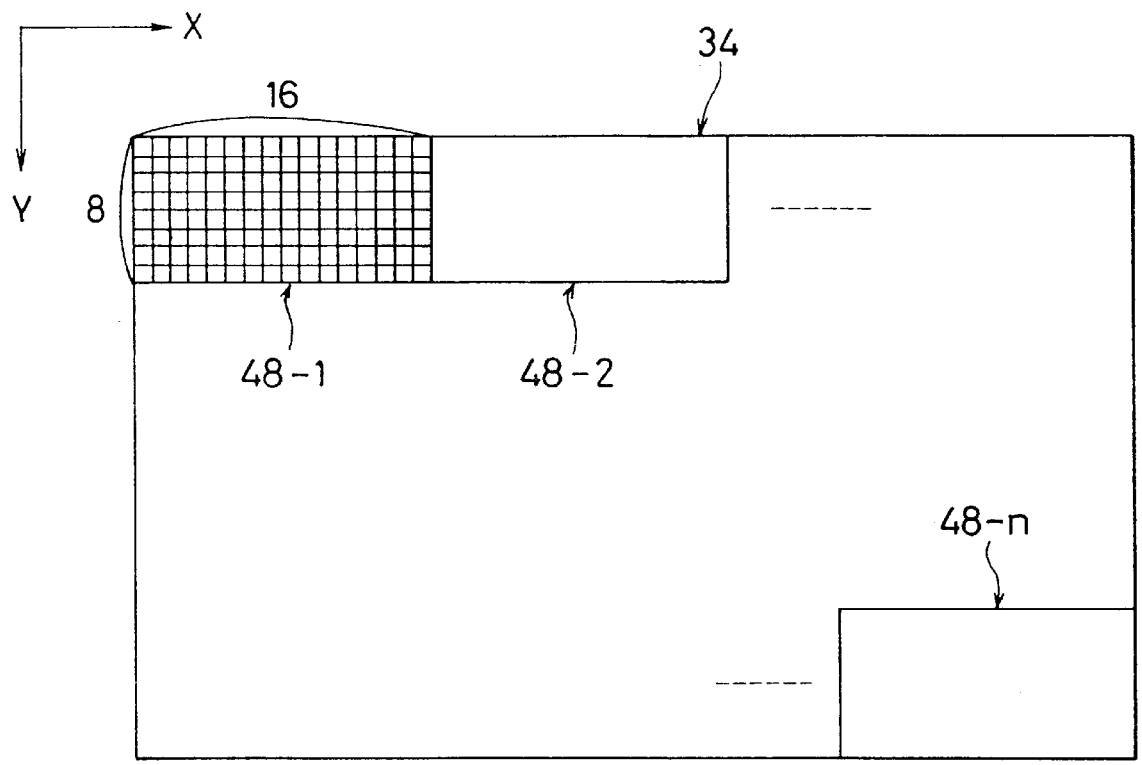
FIG. 10 is an explanatory diagram showing a method of simultaneously drawing (8×16) pixels into a frame memory in the 3-dimensional drawing mechanism.

FIG. 9 shows the 3-dimensional drawing mechanism 22 in FIG. 3 comprising drawing processing units 32-1 to 32-8 and the frame memory 34. The drawing processing units 32-1 to 32-8 execute in parallel the interpolating calculations to interpolate the portion between the vertex pixels on the basis of the vertex pixel data of the polygon which is sent from the data distributing mechanism 20. Memory areas of a plurality of picture planes are prepared in the frame memory 34. For example, two memory areas are prepared for RGB pixel data. Two memory areas are prepared for the Z buffer. Eight memory areas are prepared for storage of the texture pattern. The pixel data interpolated by the drawing processing units 32-1 to 32-8 is drawn in the frame memory 34 by the address designation of the display coordinate values (x, y). At the same time, the depth coordinate value z of each pixel is stored into the frame memory 34. As shown in FIG. 10, the drawing processing units 32-1 to 32-8 execute the simultaneous drawing operations of 128 pixel data by simultaneously accessing arbitrary positions in (16×

8) rectangular regions 48-1 to 48-n in the 3-dimensional frame memory 34. The blending, various kinds of mappings such as texture mapping and the like, hidden image erasure, and the like are included in the drawing of the frame memory 34 by the drawing processing units 32-1 to 32-8. Those processes are executed at a high speed by parallel processes.

Figure 11:
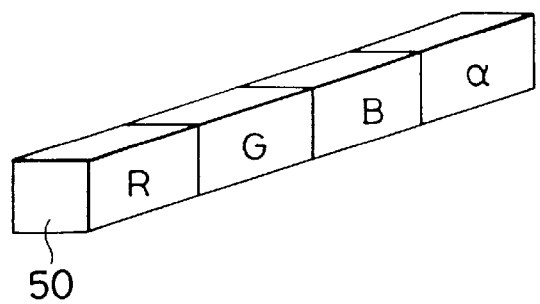
FIG. 11 is an explanatory diagram of a structure of pixel data of the invention.

FIG. 11 shows a data structure of pixel data 50 which is drawn in the frame memory 34 in FIG. 10. For example, each of the RGB components is expressed by four bits, thereby enabling 4096 colors of the RGB space to be expressed. Further, a transparent degree α, for instance, is provided as additional information. The depth coordinate value z has been stored in a Z buffer provided separately.

Referring again to FIG. 9, the 3-dimensional image data drawn in the 3-dimensional frame memory 34 of the 3-dimensional drawing mechanism 22 is transferred to the 2-dimensional drawing mechanism 26 at a display frame rate of the color display 28. The 2-dimensional drawing mechanism 26 has: a transfer buffer 36 to store the image data transferred from the 3-dimensional drawing mechanism 22; and a display frame memory 38 for allowing the frame content to be displayed by the color display 28 through a display control section 40. Further, with respect to the window control, the image data is directly drawn into the display frame memory 38 via the system bus 16 without passing through the drawing operating mechanism.

By such a construction, the 3-dimensional drawing mechanism 22 functions as a mechanism to realize a high processing speed of the 3-dimensional drawing together with the drawing operating mechanism 18. It is possible to minimize the competition with the 2-dimensional drawing mechanism 26. When the image data produced by the 3-dimensional drawing mechanism 22 shown in FIG. 3 is synthesized to the image data from another unit and the synthesized data is transferred to the 2-dimensional drawing mechanism 26, the depth data control mechanism 24 executes a merge based on the depth coordinate value (z).

Parallel Process and Time-Division Process of Texture Mapping

Figure 12:
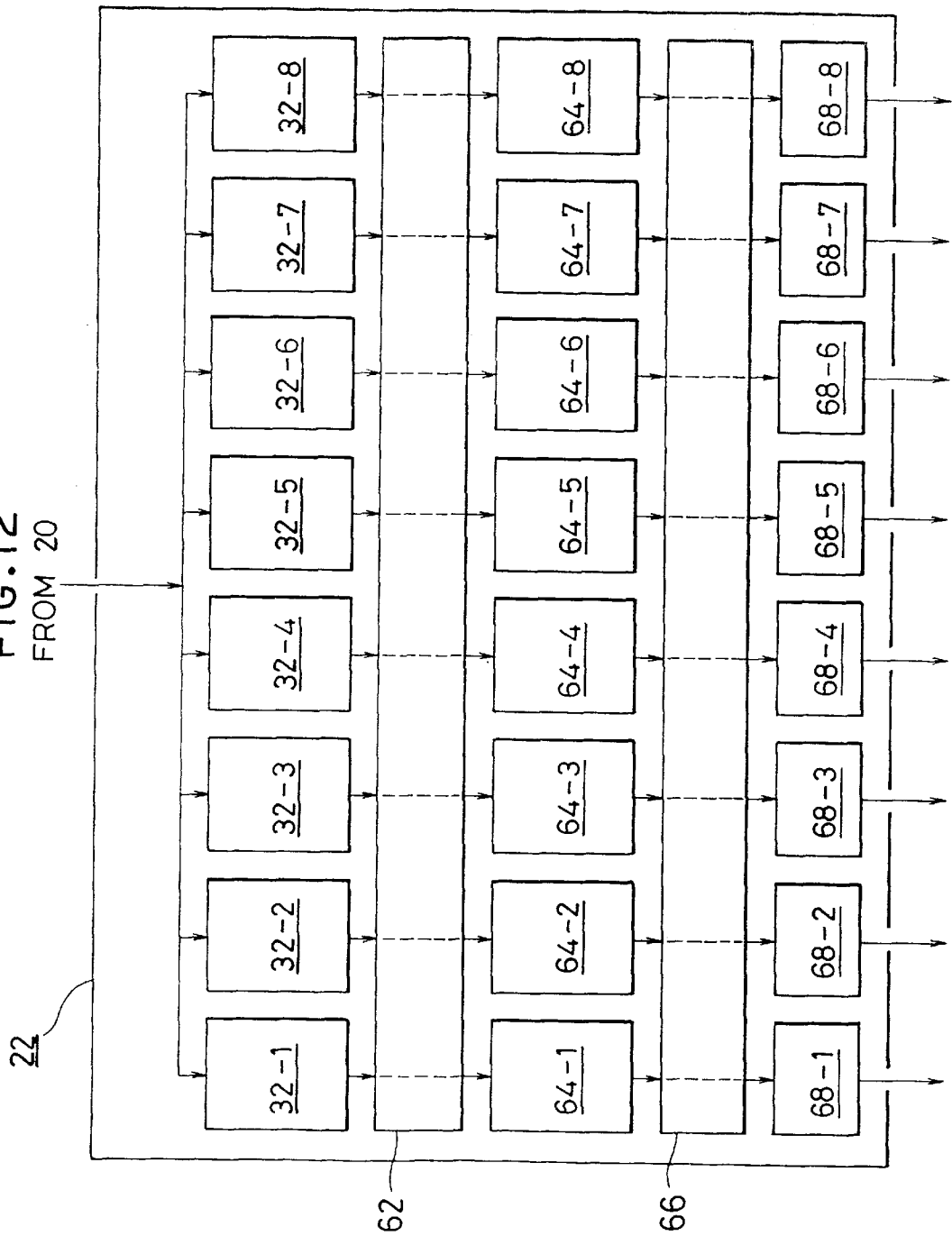
FIG. 12 is a block diagram showing a parallel processing mode in a 3-dimensional drawing mechanism in FIG. 9.

FIG. 12 shows the parallel process which is used in the mapping of the texture pattern that is executed in the 3-dimensional drawing mechanism 22 in FIG. 9. In the 3-dimensional drawing mechanism 22, the drawing processing units 32-1 to 32-8 have self texture pattern memories 64-1 to 64-8 through a switching circuit 62. The frame memory 34 is used as texture pattern memories 64-1 to 64-8 and, for example, memory areas of eight areas prepared for storage of a texture pattern are used. The texture pixel data read out from the texture pattern memories 64-1 to 64-8 are transferred to registers 68-1 to 68-8 through a switching circuit 66, respectively. Further, the registers 68-1 to 68-8 function as output registers for the frame memory for RGB in the frame memory 34 shown in FIG. 9. The texture image data stored in the register 68-1 is drawn in parallel in the frame memory 34.

In FIG. 12, broken lines indicate paths of the switching circuits 62 and 66 in the case where the same texture pattern is stored in all of the texture pattern memories 64-1 to 64-8 and the texture mapping processes are executed in parallel. That is, on the basis of the texture coordinate data (s, t) of the polygon vertex which was converted into the texture coordinates by dividing into eight pipelines by the drawing operating mechanism 18, the drawing processing units 32-1 to 32-8 read out the texture pixel data of the vertexes from the texture pattern memories 64-1 to 64-8 and, subsequently, the texture pixel data to bury the portion in the polygon is obtained by interpolating calculations.

The eight drawing processing units 32-1 to 32-8 correspond to eight lines in the X-axis direction in, for example, the batch drawing region 48-1 in the frame memory 34 shown in FIG. 10. Therefore, the drawing processing units 32-1 to 32-8 read out in a lump the texture pixel data to be written to the Y coordinate values indicative of eight lines in the direction of the X axis from the texture pattern memories 64-1 to 64-8. The drawing processing units 32-1 to 32-8 transfer the read-out data to the registers 68-1 to 68-8 and, thereafter, supply to the RGB frame memory in the frame memory 34 and is written in a lump at a time point when the texture image data of (8×16) pixels are obtained. In the parallel process shown in FIG. 12, the high-speed texture mapping can be realized because the pixel data is simultaneously drawn with respect to eight lines by the texture mapping.

Figure 13:
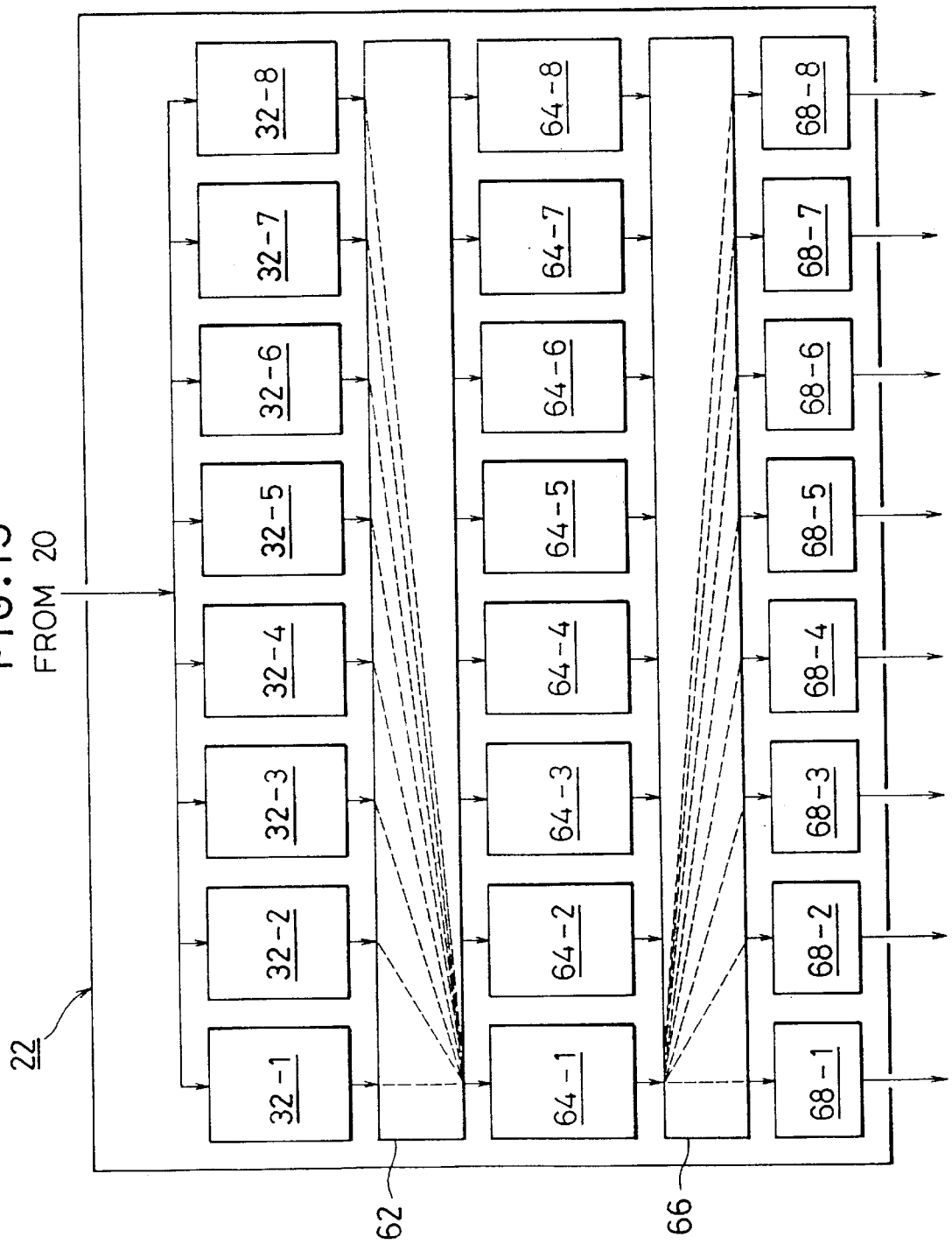
FIG. 13 is a block diagram showing a time-division processing mode in the 3-dimensional drawing mechanism in FIG. 9.

FIG. 13 shows a texture mapping by the time-division process. First, the time-division process is used in case of drawing into one frame memory 34 while switching the texture pattern. Therefore, necessary kinds of different texture patterns are previously stored into the texture pattern memories 64-1 to 64-8. In FIG. 13, broken lines indicate the case where the switching circuits 62 and 66 select the texture pattern in the texture pattern memory 64-1 and the data is drawn. That is, the drawing processing units 32-1 to 32-8 receive the texture coordinate data (s, t) indicative of the polygon vertexes supplied from the higher-order apparatus and interpolates the texture coordinate data which buries the portion between the vertexes. The switching circuit 62 first couples a read access from the image processing unit 32-1 to the texture pattern memory 64-1 and transfers the read-out texture pixel data to the register 68-1 by the switching circuit 66. Subsequently, the switching circuit 62 couples the read access of the drawing processing unit 32-2 to the same texture pattern memory 64-1 and transfers the read-out texture pixel data to the register 68-2 by the switching circuit 66. In a manner similar to the above, the read access is executed to the texture pattern memory 64-1 in accordance with the order of the drawing processing units 32-3 to 32-8 and the texture pixel data is transferred to the registers 68-3 to 68-8. The above processes are repeated. On the other hand, when a switching command of the texture pattern is received from the whole control section 10, the processing mode is switched to the time-division processing mode for the other texture pattern memory instructed. In the time-division process of the texture mapping as mentioned above, an extreme decrease in drawing speed in the case where the texture patterns are read out from an external hard disc and exchanged upon switching of the patterns is eliminated. The pattern can be drawn at a certain processing speed while exchanging the texture patterns.

Figure 14:
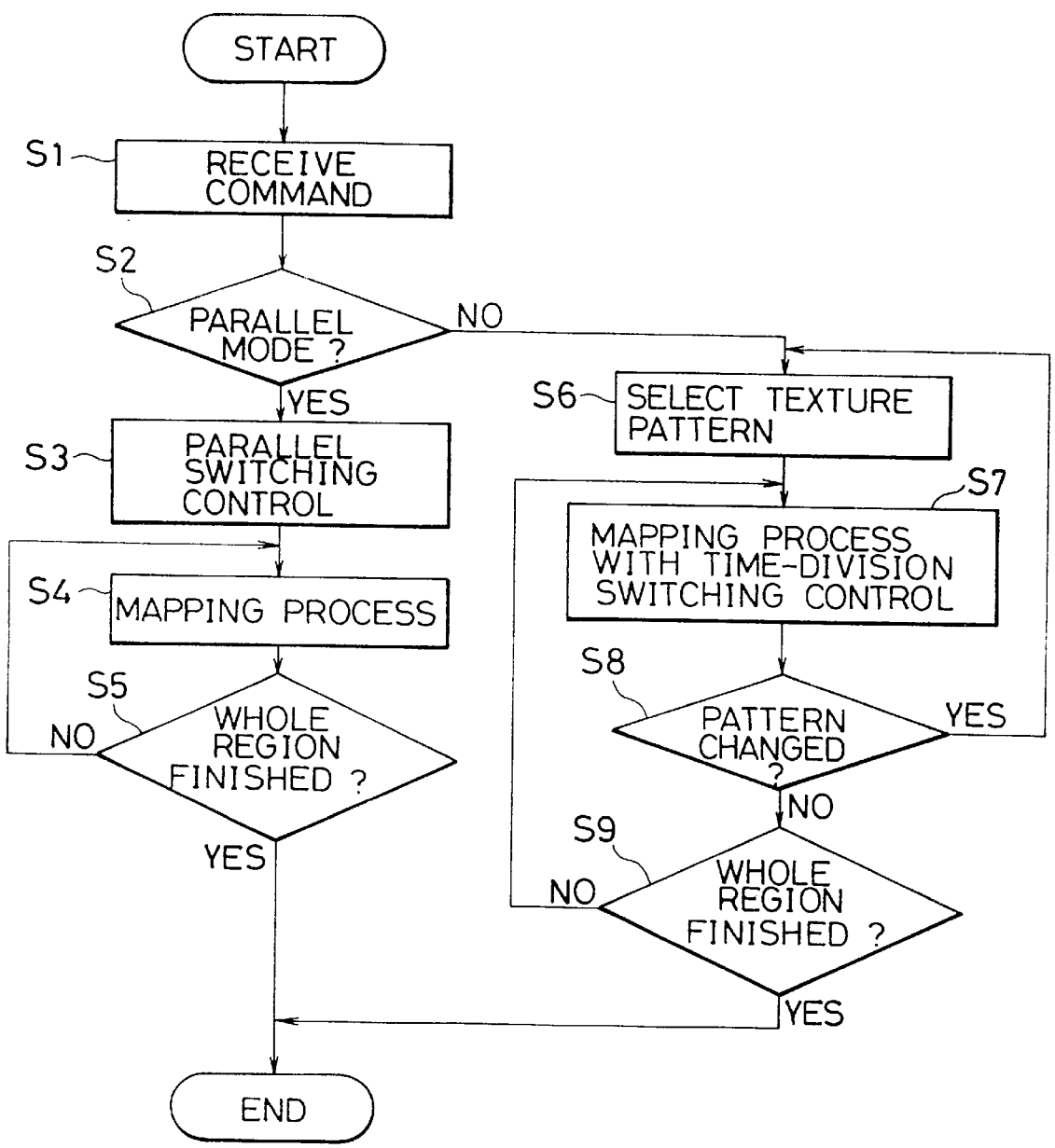
FIG. 14 is a flowchart showing mapping processes in the parallel processing mode and time-division processing mode in the invention.

FIG. 14 is a flowchart showing the processing operations of the parallel process shown in FIG. 12 and the time-division process shown in FIG. 13. In FIG. 14, when a command for texture mapping is received from the whole control section in step S1, a check is made to see if the parallel mode has been set or not. If YES, as shown in FIG. 12, the switching control of the parallel mode is executed with respect to the switching circuits 62 and 66. In step S4, the parallel mapping process is repeatedly executed until the drawing of the whole region has been completed in step S5.

On the other hand, in case of the time-division processing mode in step S2, step S6 follows and either one of a plurality of texture pattern memories is selected. In step S7, as shown in FIG. 13, the mapping process such that the selected texture pattern memories are sequentially read-accessed by the drawing processing units and the pattern is drawn is executed. While the mapping process is being executed, the presence or absence of a change in texture pattern is discriminated in step S8. When a changing command of the texture pattern is received, the processing routine is returned to step S6 and a new texture pattern memory is selected. The above processes are repeated until the mapping of the whole region is finished in step S9.

Figure 15:
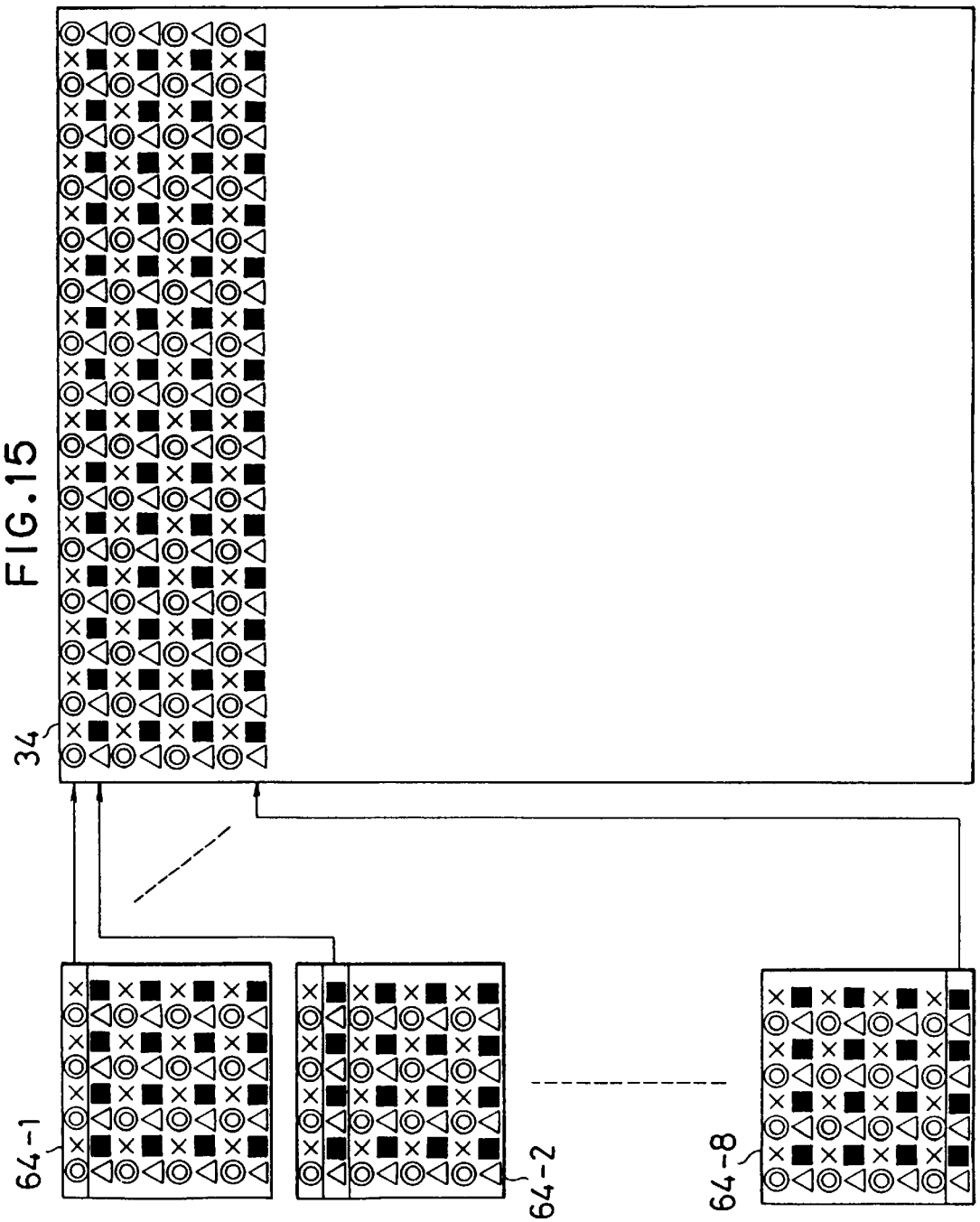
FIG. 15 is an explanatory diagram of a texture pattern mapped in the parallel processing mode.

FIG. 15 is an explanatory diagram of a texture pattern mapped in the parallel processing mode in FIG. 12. Namely, the texture patterns each of which is constructed by the same texture pixel data have been stored in the texture pattern memories 64-1 to 64-8. The texture pixel data at the positions of the Y coordinate values of eight lines in the frame memory 34 is read out and drawn.

Figure 16:
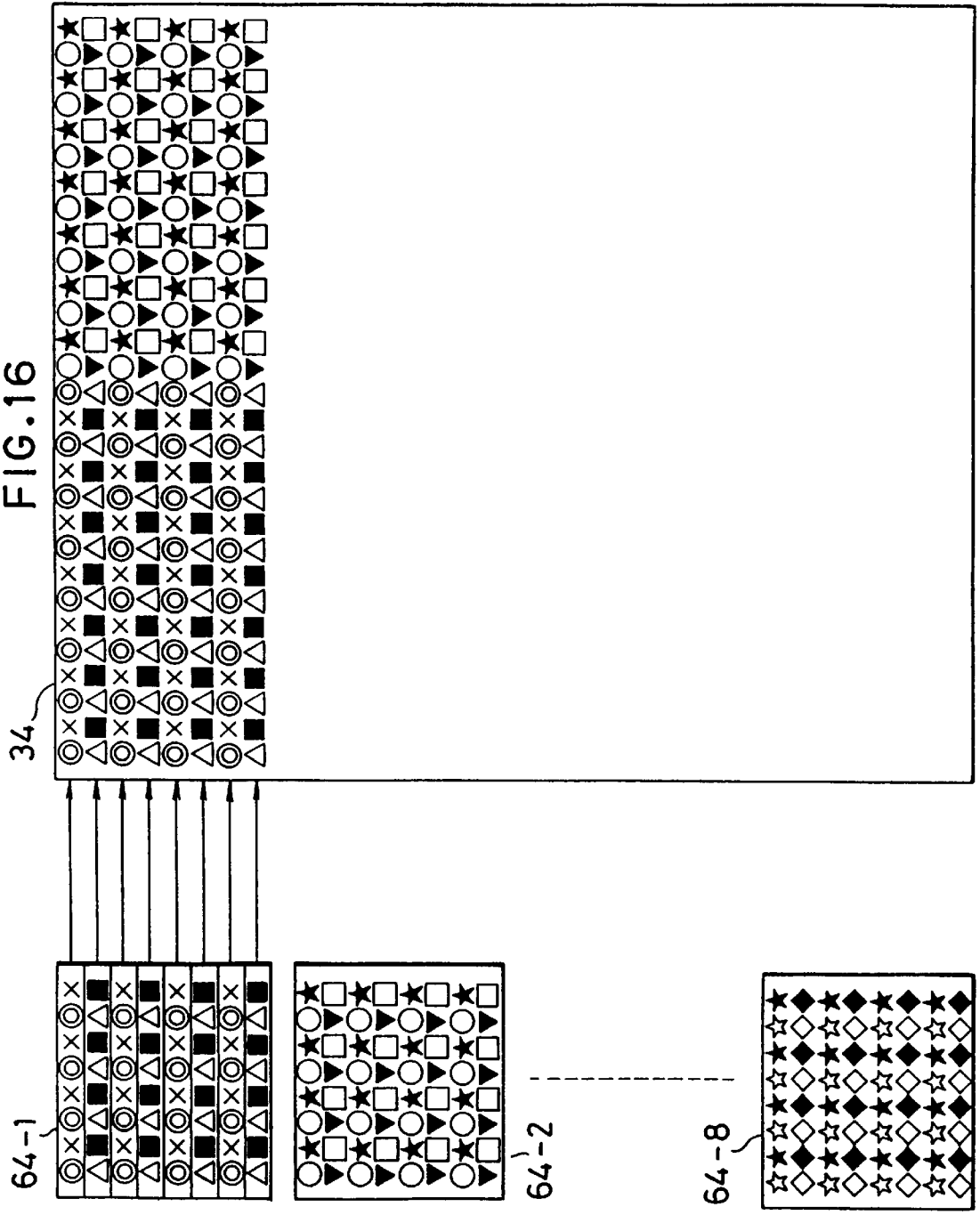
FIG. 16 is an explanatory diagram of a texture pattern mapped in the time-division processing mode.
Figure 17:
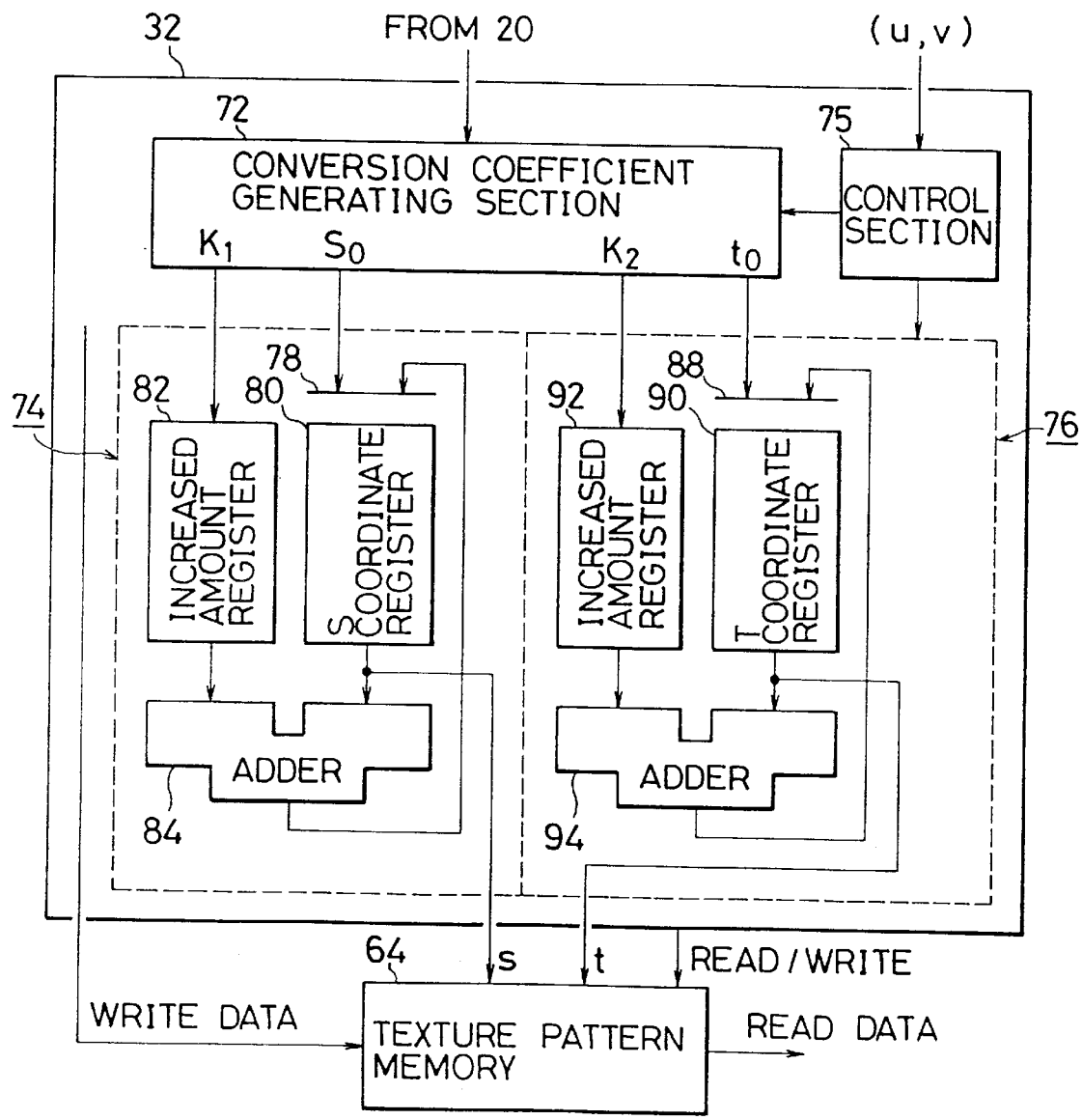
FIG. 17 is a block diagram of a texture mapping mechanism provided in a drawing processing unit in the 3-dimensional drawing mechanism.

FIG. 16 is an explanatory diagram of a texture pattern mapped in the time-division processing mode in FIG. 13. Different texture patterns have been stored in the texture pattern memories 64-1 to 64-8. The texture pattern by the selection of the texture pattern memory 64-1 has first been drawn in the frame memory 34. The texture pattern is exchanged to the pattern in the next texture pattern memory 64-2 and drawn on the way of the drawing. cl Principle and Construction of Texture Mapping Mechanism FIG. 17 shows a texture mapping mechanism provided as a hardware for the drawing processing units 32-1 to 32-8 provided for the 3-dimensional drawing mechanism 22 in FIG. 9. The texture mapping mechanism of the drawing processing unit 32 in FIG. 17 comprises: a conversion coefficient generating section 72; a control section 74; an S coordinate calculating section 75; and a T coordinate calculating section 76. A selector 78, an S coordinate register 80, an increased amount register 82, and an adder 84 are provided for the S coordinate calculating section 74. An output of the adder 84 is supplied to the other input terminal of the selector 78. The T coordinate calculating section 76 is constructed by a selector 88, a T coordinate register 90, an increased amount register 92, and an adder 94.

The principle of the texture mapping will now be described with reference to FIG. 18. A 3-dimensional object 98 which is given as figure data assumes a cylindrical body and it is now assumed that the cylindrical surface is expressed by a texture pattern. Therefore, a predetermined texture pattern has previously been stored in the texture pattern memory 64 as a set of texture pixel data. First, a texture pattern 100 stored in the texture pattern memory 64 is adhered to the 3-dimensional object 98. With respect to the 3-dimensional object 98 to which the texture pattern 100 has been adhered, a 2-dimensional surface shape 102 in the case where it is seen as a projection image from a predetermined direction is obtained. The 2-dimensional surface shape 102 is expressed by coordinate values (u, v) of the UV surface shape coordinates. The texture pattern 100 adhered to the 3-dimensional object 98 is made correspond to a set of polygon such as triangle or quadrilateral in a one-to-one corresponding manner. The process of the polygon in the hatched portion at the left upper corner of the texture pattern 100 adhered to the 3-dimensional object 98 will now be explained as an example. The polygon is expressed by a set of four vertex coordinates. Therefore, the coordinate values (u, v) of each of the vertexes O, P, Q, and R of the polygon in the hatched portion of the 2-dimensional surface shape 102 can be specified. The vertexes OPQR of the polygon of the UV surface shape coordinates correspond to the vertexes OPQR of the ST texture coordinates in the texture pattern memory 64 in a one-to-one corresponding manner. The coordinate values (u, v) of the vertexes OPQR of the polygon of the 2-dimensional surface shape 102 are converted into the coordinate values (s, t) of the corresponding vertexes OPQR of the texture pattern 64. Further, with regard to the portions other than the vertexes OPQR, the coordinate values (s, t) are obtained by the linear interpolation. By the conversion from the UV surface shape coordinate values (u, v) to the ST texture coordinate values (s, t) of the texture pattern memory 64, the corresponding texture image data is read out and written to the corresponding pixel positions of the XY display coordinates of the frame memory 34, so that the texture mapping can be performed. The converting calculation of the polygon vertexes to the texture coordinates is executed by the drawing operating mechanism 18 in the unit of FIG. 3.

Figure 18:
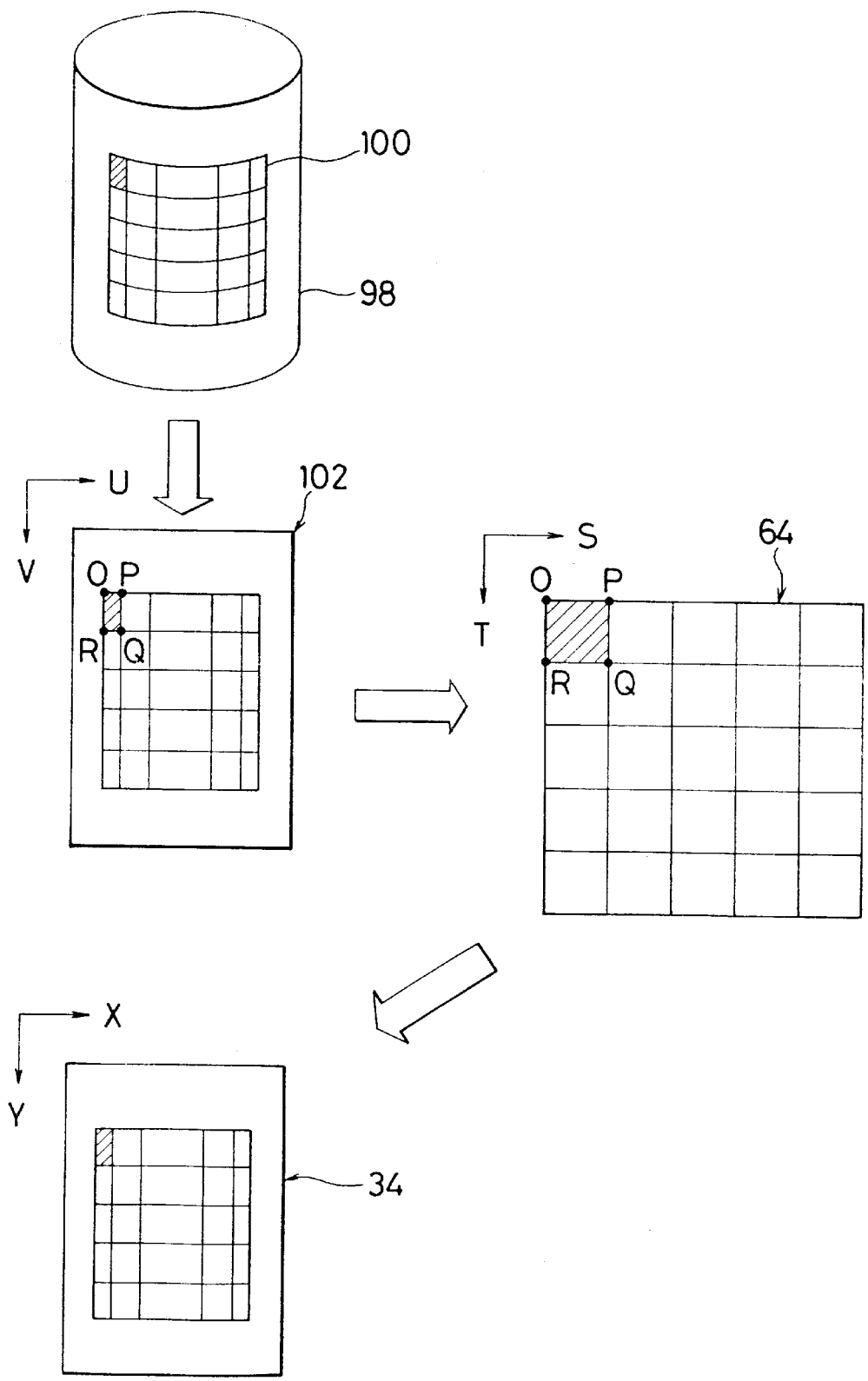
FIG. 18 is an explanatory diagram showing the principle of the texture mapping accompanied with a coordinate transformation.
Figure 19:
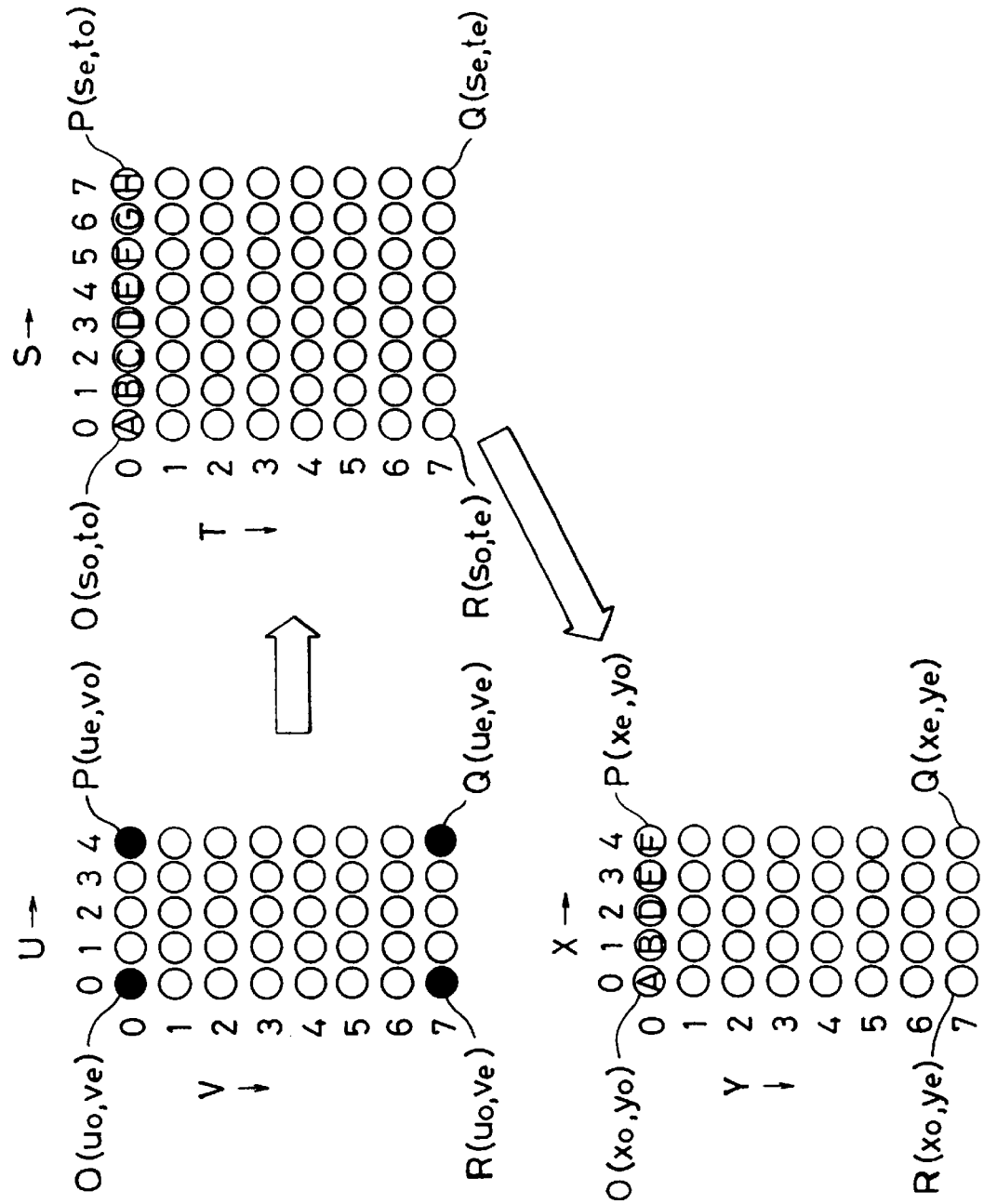
FIG. 19 is a practical explanatory diagram of the texture mapping regarding a quadrilateral polygon.

FIG. 19 practically shows a texture mapping of a quadrilateral polygon in FIG. 18. When a texture pattern consisting of (8×8) pixels of the coordinate values (s, t) of the ST texture coordinates is adhered to the surface of the 3-dimensional object, the coordinate values (u, v) of the UV surface shape coordinates indicative of the 2-dimensional surface shape in such a case change to a set of (8×5) pixels. The coordinate values of the vertexes O, P, Q, and R at the coordinate values (u, v) of the UV surface shape coordinates and the coordinate values (s, t) of the ST texture coordinates are defined as shown in the diagram. The first row in the U-axis direction of the UV surface shape coordinates comprises five pixels and the first row of the coordinate values (s, t) of the ST texture coordinates comprises eight pixels. In this instance, since the vertexes O and P of both ends correspond to each other in a one-to-one corresponding manner, the S coordinate values corresponding to three pixels of u=1, 2, and 3 at the coordinate values (u, v) of the UV surface shape coordinates are obtained by linear interpolation. Similarly, when considering the corresponding relation between the vertexes O and R of the first column as the V-axis direction and T-axis direction, the vertexes O and R correspond to each other in a one-to-one corresponding manner. First, the increased amount value $K_1$ in the S-axis direction and the increased amount value $K_2$ in the T-axis direction are obtained by the following equations.

$$K_1=(s_e-s_0)/(u_e-u_0) \qquad (1)$$

$$K_2=(t_e-t_0)/(v_e-v_0) \qquad (2)$$

As mentioned above, when the increased amount value $K_1$ in the S-axis direction and the increased amount value $K_2$ in the T-axis direction are obtained, the coordinate values s and t for changes in coordinate values u and v can be obtained by the following equations.

$$s=s_0+(u-u_0)K_1 \qquad (3)$$

$$t=t_0+(v-v_0)K_2 \qquad (4)$$

With respect to FIG. 19, the increased amount values $K_1$ and $K_2$ in the S-axis direction and the T-axis direction are practically obtained as follows.

$$\begin{aligned} K_1 &= (s_e - s_0)/(u_e - u_0) \\ &= (7-0)/(4-0) \\ &= 7/4 = 1.75 \end{aligned}$$

-continued $$K_2 = (t_e - t_0)/(v_e - v_0)$$
$$= (7-0)/(7-0)$$
$$= 7/7 = 1$$

The values of the coordinate values (s, t) of the ST texture coordinates for changes in coordinate values (u, v) of the first row of the UV surface shape coordinates in FIG. 19 are calculated as shown in a table of FIG. 20. In FIG. 20, the calculated coordinate values (s, t) of the ST texture coordinates have numerical values below decimal point. However, since the pixel data is drawn to the XY display coordinates in the frame memory on a pixel unit basis, the coordinate values are converted into the coordinate values (s, t) of the ST texture coordinates corresponding to integers by omitting the figures below a decimal point. The texture pixel data of the coordinate values (s, t) of the ST texture coordinates obtained by the coordinate transformation have the color values A to H. As a result, those texture color values are read out from the texture pattern memory by the coordinate values (s, t) and are written as shown at the first row of the XY display coordinates as shown in FIG. 19, thereby performing the mapping of the texture pattern.

In FIGS. 18 and 19, the quadrilateral polygon has been used as an example for simplicity of explanation. However, in the 3-dimensional graphics drawing apparatus of the invention shown in FIG. 3, a triangular polygon is used.

FIG. 21 shows polygon command data which is supplied from the higher-order apparatus to the drawing processing unit 32 shown in FIG. 17. The UV vertex coordinate values, ST vertex coordinate values, and further a drawing magnification N are designated on a polygon unit basis.

Figure 22:
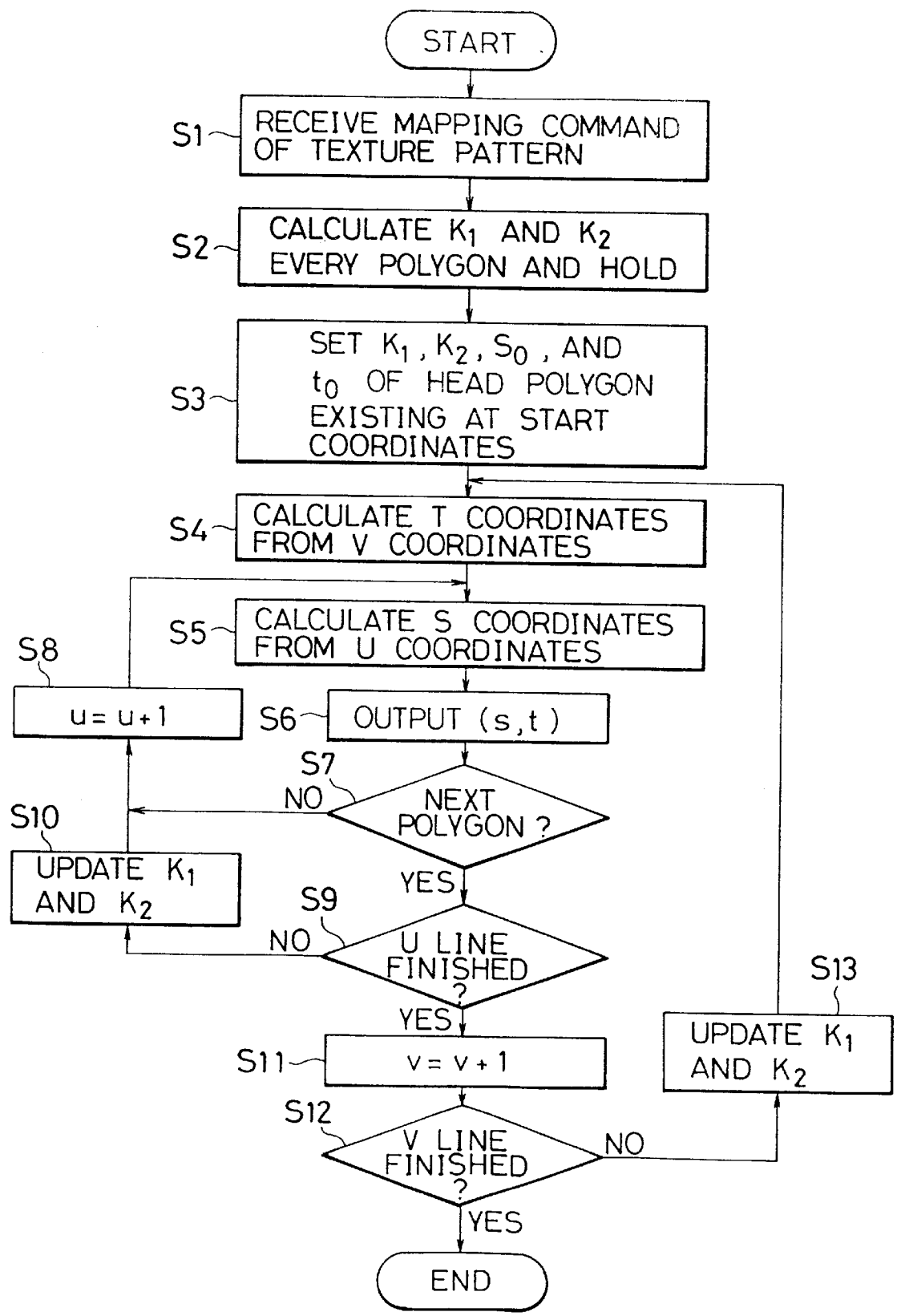
FIG. 22 is a flowchart showing the processing operation of the texture mapping in FIG. 17.

FIG. 22 is a flowchart showing the processing operation of the texture mapping mechanism in FIG. 17. First, in step S1, polygon command data shown in FIG. 21 is received. In step S2, the increased amount values $K_1$ and $K_2$ are calculated and held every polygon by the equations (1) and (2). In step S3, the increased amount values $K_1$ and $K_2$ and initial values $s_0$ and $t_0$ of the head polygon locating at the start coordinate position of the UV surface shape coordinates are set. Practically speaking, the increased amount value $K_1$ is set into the increased amount register 82 of the S coordinate calculating section 74 in FIG. 17 and the initial value $s_0$ is set into the S coordinate register 80. At the same time, the increased amount value $K_2$ is set into the increased amount register 92 of the T coordinate calculating section 76 and the initial value $t_0$ is set into the T coordinate register 90. Subsequently, the T coordinate value t is calculated from the V coordinate value v at that time in step S4.

For example, the initial value $t_0$ in the T coordinate register 90 is first generated as it is in FIG. 17. At the second and subsequent times, the value which is obtained by adding $K_2$ of the increased amount register 92 to the initial value $t_0$ of the T coordinate register 90 by the adder 94 is set into the register 90 and is generated as a new coordinate value t. In step S5, the S coordinate value s is calculated from the U coordinate value u at that time in step S5. That is, in the S coordinate calculating section 74 in FIG. 17, the initial value $s_0$ of the S coordinate register 80 is first generated as it is. At the second and subsequent times, the value which is obtained by adding the increased amount value $K_1$ of the increased amount register 82 to the coordinate value of the S coordinate register 80 by the adder 84 is again set into the register 80 and is generated as a new S coordinate value. In step S6, the calculated ST texture coordinate values (s, t) are generated. A check is made in step S7 to see if the polygon is the next polygon or not. In case of the same polygon, the U coordinate value u is increased one by one in step S8. The converting calculation from the U coordinate value u to the S coordinate value s in step S5 is repeated. When the processing routine advances to the next polygon after the process for one polygon was finished, a check is made in step S9 to see if the U-axis line has been finished or not. If NO, the increased amount values $K_1$ and $K_2$ are updated in step S1 with regard to the new polygon and processes similar to those mentioned above are repeated. When the process of the U-axis line is finished in step S9, the processing routine advances to step S11 and the V coordinate value v is increased by "1". A check is now made in step S12 to see if the process of the V-axis line has been finished or not. If NO, the increased amount values $K_1$ and $K_2$ at the new V-axis line are updated in step S13. The processes from step S4 are again repeated.

Enlarged Drawing of Texture Pattern

Figure 23:
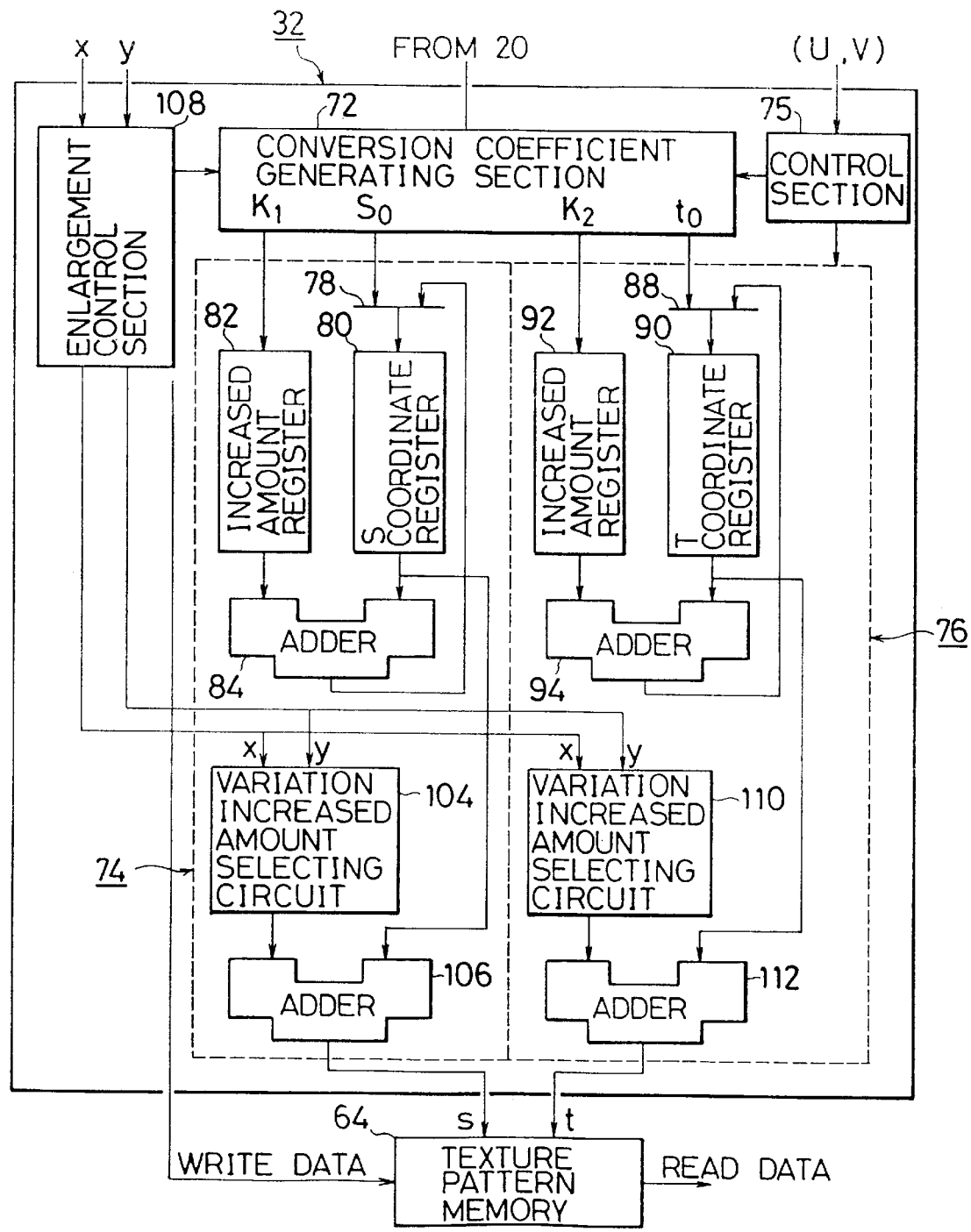
FIG. 23 is a block diagram of a texture mapping mechanism of the present invention which is used for the enlarged drawing.

FIG. 23 shows the texture mapping mechanism of the present invention which is used in the enlarged drawing. The texture mapping mechanism which is realized by the hardware of the drawing processing unit 32 is fundamentally the same as that in the embodiment of FIG. 17. However, with respect to the S coordinate calculating section 74, a variation increased amount selecting circuit 104 and an adder 106 are newly provided. With respect to the T coordinate calculating section 76, a variation increased amount selecting circuit 110 and an adder 112 are newly provided. Further, the coordinate values (x, y) of the XY display coordinates in the frame memory which are drawn by the texture mapping are supplied as selection information of the variation increased amounts to the variation increased amount selecting circuits 104 and 110 through an enlargement control section 108. First, to enlargely draw a texture pattern at a rate of (1:N), it is sufficient to reduce the S coordinate increased amount value $K_1$ and the T coordinate increased amount value $K_2$ which are set into the increased amount registers 82 and 92 into 1/N of the values which are used when the data is drawn at a rate of (1:1).

For simplicity of explanation, in the case where the coordinate values (u, v) of the UV surface shape coordinates correspond to the coordinate values (s, t) of the texture surface shape coordinates in a one-to-one corresponding manner, the coordinate transformation is unnecessary, so that both of the increased amount values $K_1$ and $K_2$ in this case are equal to 1. In this instance, to enlargedly draw the texture pattern at a rate of (1:N), $K_1$ and $K_2$ are set as follows.

$$K_1 = K_2 = 1/N$$

In case of enlargedly drawing a texture pattern at a rate of, for example, (1:4) by setting the increased amount values $K_1$ and $K_2$ which are set to 1/N, respectively, $K_1 = K_2 = 0.25$ and each of the ST coordinate values (s, t) to be obtained increases such that $0.00 \rightarrow 0.25 \rightarrow 0.50 \rightarrow 0.75 \rightarrow 1.00 \rightarrow 1.25 \ldots$. Among those values, the coordinate values which were rounded to integers can be used when the ST texture coordinates are actually read out. Therefore, as for the four values of 0.00 to 0.75, (0, 0) are designated as coordinate values (s, t) by the process to round to integers. This results in that the four same texture pixel data are arranged and mapped. In the variation increased amount selecting circuits 104 and 110, in order to prevent that the same texture pixel data which is generated from the adders 84 and 94 is arranged by only the same number as the enlargement magnification N and are seen as a block-like pattern, the variation increased amount values are selected by the selecting circuits 104 and 110 and are added by the adders 106 and 112 in order to distribute the coordinate values obtained by the adders 84 and 94. The case of enlargedly drawing a texture pattern at a rate of (1:4) will now be described as an example. The increased amount selecting circuits 104 and 110 select four kinds of values 0.00, 0.25, 0.50, and 0.75 which change on a 0.25 unit basis by the designation by lower two bits of the XY display coordinate values (x, y) in the frame memory.

Practically speaking, FIG. 24 shows the S coordinate values which are generated from the S coordinate adder 84 for changes in lower two bits 00 to 11 of the XY display coordinate values (x, y). In this case, the S coordinate values have values of 0.00 to 0.75 and the ST texture coordinates must be integers. Therefore, all of the coordinate values which are calculated by the process to round to integers are equal to 0. This means that the same texture pixel data is mapped.

FIG. 25 shows a variation increased amount storage table provided for the variation increased amount selecting circuit 104 of the S coordinate calculating section 74. Four kinds of variation increased amount values of 0.00 to 0.75 arranged at random by lower two bits of the XY display coordinate values (u, v) have been stored in such a table.

FIG. 26 shows the S coordinate values in which the variations were added by the adder 106 in FIG. 23 for changes of lower two bits of the frame XY display coordinate values (x, y). In the case where the variations are not added in FIG. 24, by adding the variation increased amounts in FIG. 25 to the coordinate values smaller than 1, the coordinate values of 1 or more exist as shown in FIG. 26 and a reading range of the texture pixel data is distributed.

FIG. 27 shows the T coordinate values which are generated from the T coordinate adding section 94. FIG. 28 shows a variation increased amount selection table which is stored in the variation increased amount selecting circuit 110 of the T coordinate calculating section 76. Further, FIG. 29 shows the coordinate values to which the variation values were added and which are generated from the T coordinate adding section 112.

Figure 30:
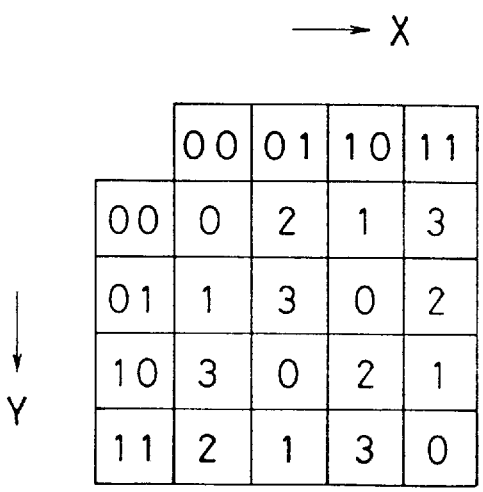
FIG. 30 is an explanatory diagram showing the orders of table arrangement of the variation values in FIGS. 25 and 28.

FIG. 30 shows storing rules of the variation values 0.00 to 0.75 for the tables which are set into the variation increased amount selecting circuits 104 and 110 in FIGS. 25 and 28. In FIG. 30, reference numerals 0 to 3 indicate the increased amount values 0.00 to 0.75. For example, when the first row at which Y=00 will now be explained as an example, since the magnification N=4, 0 is set to the first position. The position is subsequently shifted to the right by only N/2, namely, only (4÷2=2) and 1 is set there. After that, the position is contrarily returned to the left by N/4, namely, (4/4=1) and 2 is set there. After the processes of the first row as mentioned above was finished, numerical values 3, 2, 1, and 0 are sequentially set in the Y-axis direction for the last numeral 3 of the first row. With regard to the second, third, and fourth rows, the sequences of the first row which is precedent to the last numerical values 2, 1, and 0 are inserted. It is now assumed that when the sequence reaches the right edge, it is looped to the left edge. For example, with respect to the last numeral 2 of the second row, 0 is set because 0 exists before 2 from the first row. With respect to the position before 0, since the first row is continuous with 3 at the right edge, 3 is set. Since 1 exists at the position before 3 of the first row, 1 is set into the head position of the second row by the rules shown in FIG. 30. By forming the tables of the variation increased amounts in FIGS. 25 and 28, a proper distributing process can be executed.

Figure 31:
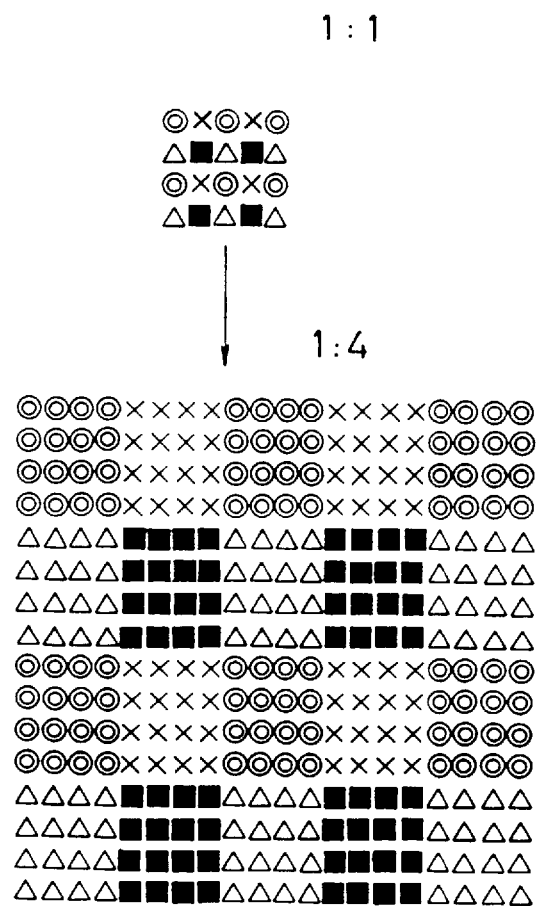

FIG. 31 shows texture mapping patterns based on rates (1:1) and (1:4) in a state of no variation. With respect to the enlarged drawing, a block-like pattern is conspicuous.

FIG. 32 shows the case with variations with respect to the rates (1:1) and (1:4). In case of enlargedly drawing at a rate of four times, the block boundary is broken and distributed by the addition of the variation increased amount values, so that the pattern can be made inconspicuous as a block when it is seen from far away.

FIG. 33 shows the S coordinate values without a variation in case of setting the enlarging rate to (1:8). FIG. 34 shows a table of the S coordinate variation values which is used for enlargement drawing of (1:4). FIG. 35 shows the S coordinate values in which the values of FIGS. 33 and 34 were added. FIGS. 36, 37, and 38 show the T coordinate values without a variation in the enlarged drawing of (1:8), a variation table, and T coordinate values after variation values were added, respectively.

Figure 40:
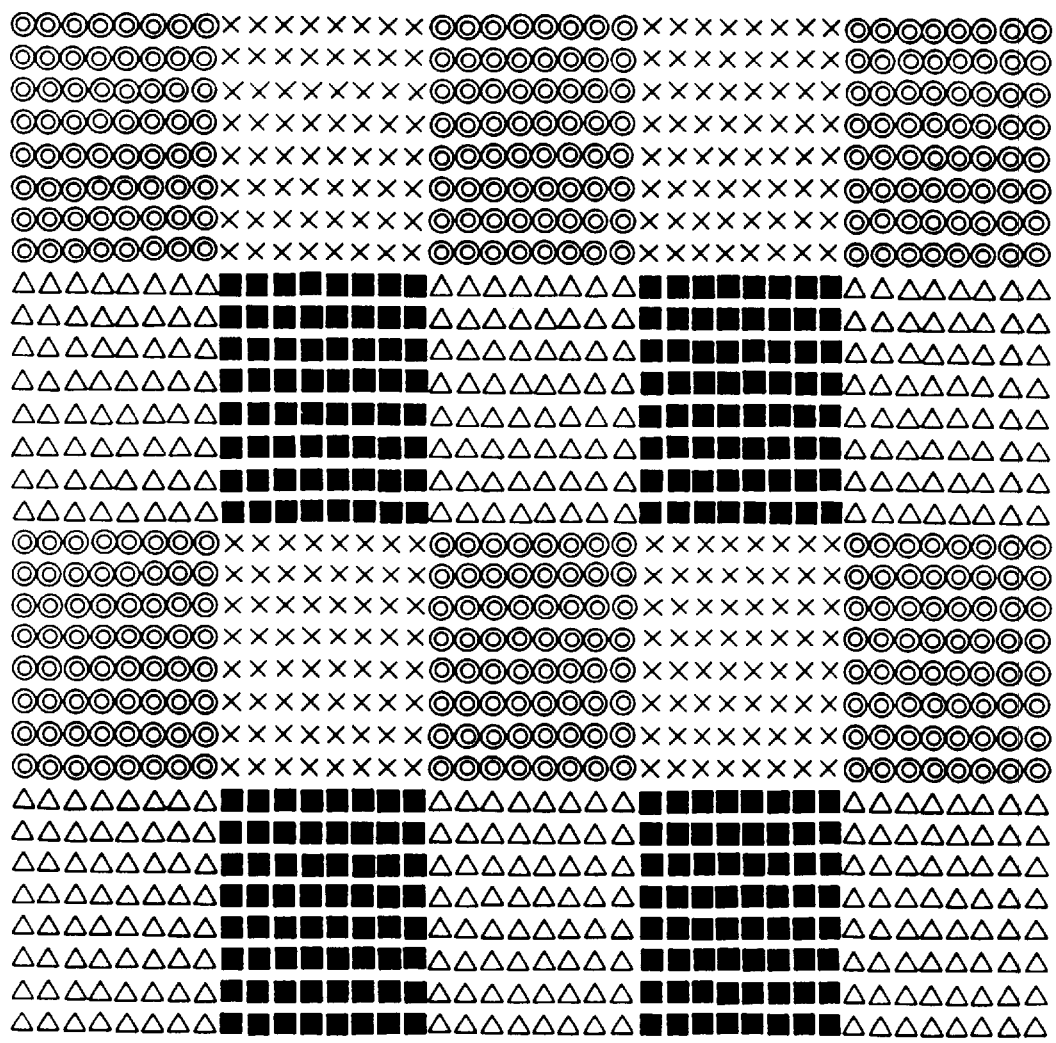
FIG. 40 is an explanatory diagram of a texture pattern drawn at a rate of (1:8) without adding the variation values.
Figure 41:
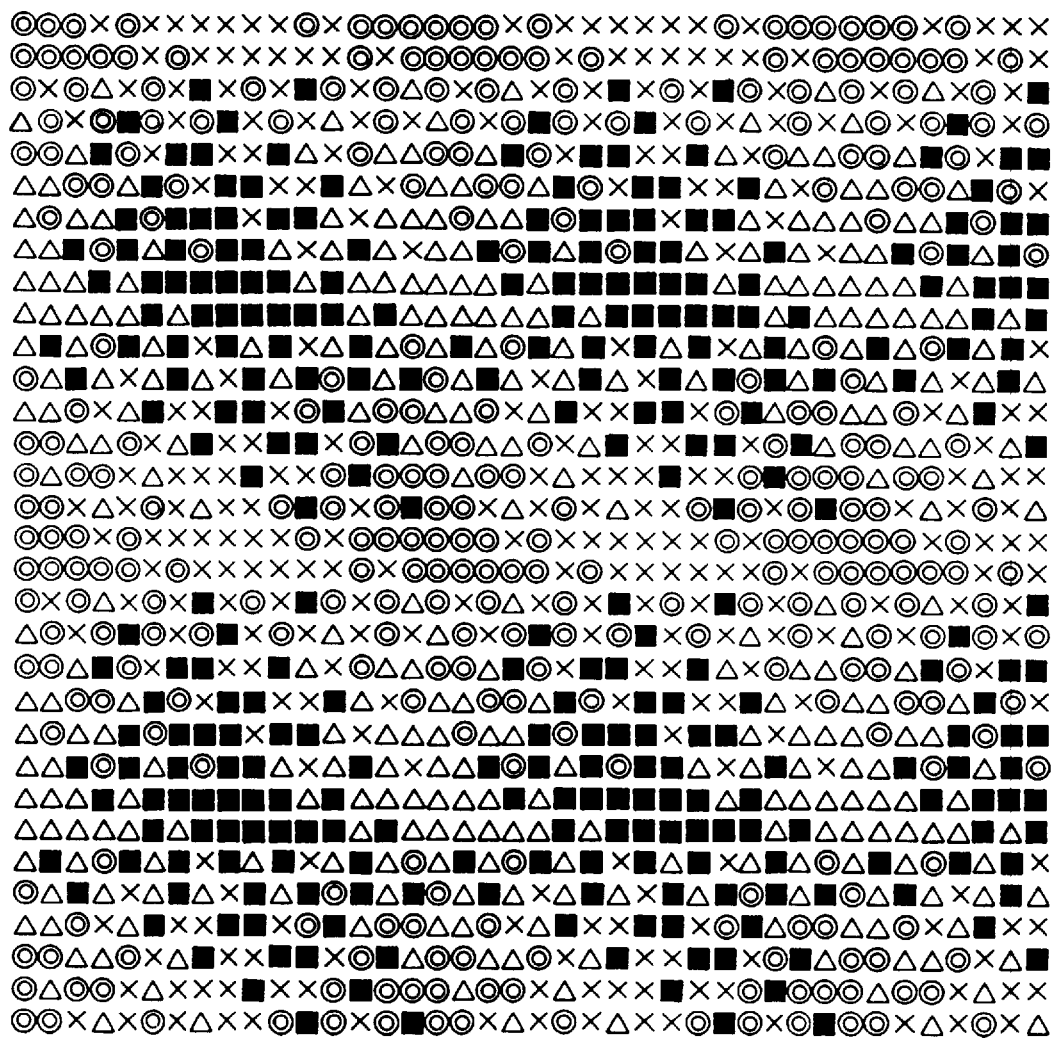
FIG. 41 is an explanatory diagram of a texture pattern drawn at a rate of (1:8) by adding the variation values.

FIG. 40 shows a texture pattern which was enlargedly drawn at a rate of (1:8) without any variation and a block-like boundary each comprising (8×8) pixels is conspicuous. FIG. 41 shows a texture pattern to which a variation value was added at an enlargement rate of (1:8). The boundary of the block is almost completely broken and even when the pattern is enlargedly drawn, it is not recognized as a block noise and the enlargement drawing of a smooth texture pattern can be realized.

In FIG. 23, when a proper texture pattern which is used for texture mapping is written into a texture pattern memory 64, the increased amount value $K_1$ of the increased amount register 82 of the S coordinate calculating section 74 is set to $K_1=1$ and the increased amount value $K_2$ of the increased amount register 92 of the T coordinate calculating section 76 is set to $K_2=0$. Further, all of the variation increased amount values of the variation increased amount selecting circuits 104 and 110 are set to 0. Due to this, the texture pixel data transferred from an external hard disc or the like can be written to one line in the S-axis direction in the texture pattern memory 64. After completion of the writing of the data of one line in the S-axis direction, the value of the T coordinate register 90 is increased by "1". The position is shifted to the next line of the S axis. The value of the S coordinate register 80 is returned to the initial value. A start point of the next line is set. The texture pixel data is similarly written in the direction of the S-axis line.

The above embodiment has been described with respect to the cases of enlargedly drawing at the rates of (1:4) and (1:8) as examples. The enlargement rate, however, can be properly set in accordance with the necessity.

For simplicity of explanation, the embodiment has been described as an example with regard to the case where there is no need to perform the coordinate transformation such that the coordinate values (u, v) of the UV surface shape coordinates correspond to the coordinate values (s, t) of the ST texture coordinates in a one-to-one corresponding manner. However, the invention can be also substantially similarly applied to the case where the coordinate transformation such that the increased amount values $K_1$ and $K_2$ have values of 1 or more is needed.

Further, the above embodiment has been described as an example with respect to the case where the texture mapping mechanism is realized by the digital signal processors. However, the texture mapping mechanism can be also constructed by a special hardware or a part of processes can be also realized by a software by programs.

Moreover, the above embodiment has been described as an example with respect to the case of realizing the drawing operating mechanism by parallel processes of the pipeline construction. However, as for the variation process when the enlarged drawing shown in FIG. 23 is executed, it can be applied as it is to the texture mapping by a single digital signal processor or MPU.

Memory Device Having Interpolation Operating Mechanism Therein

Figure 42:
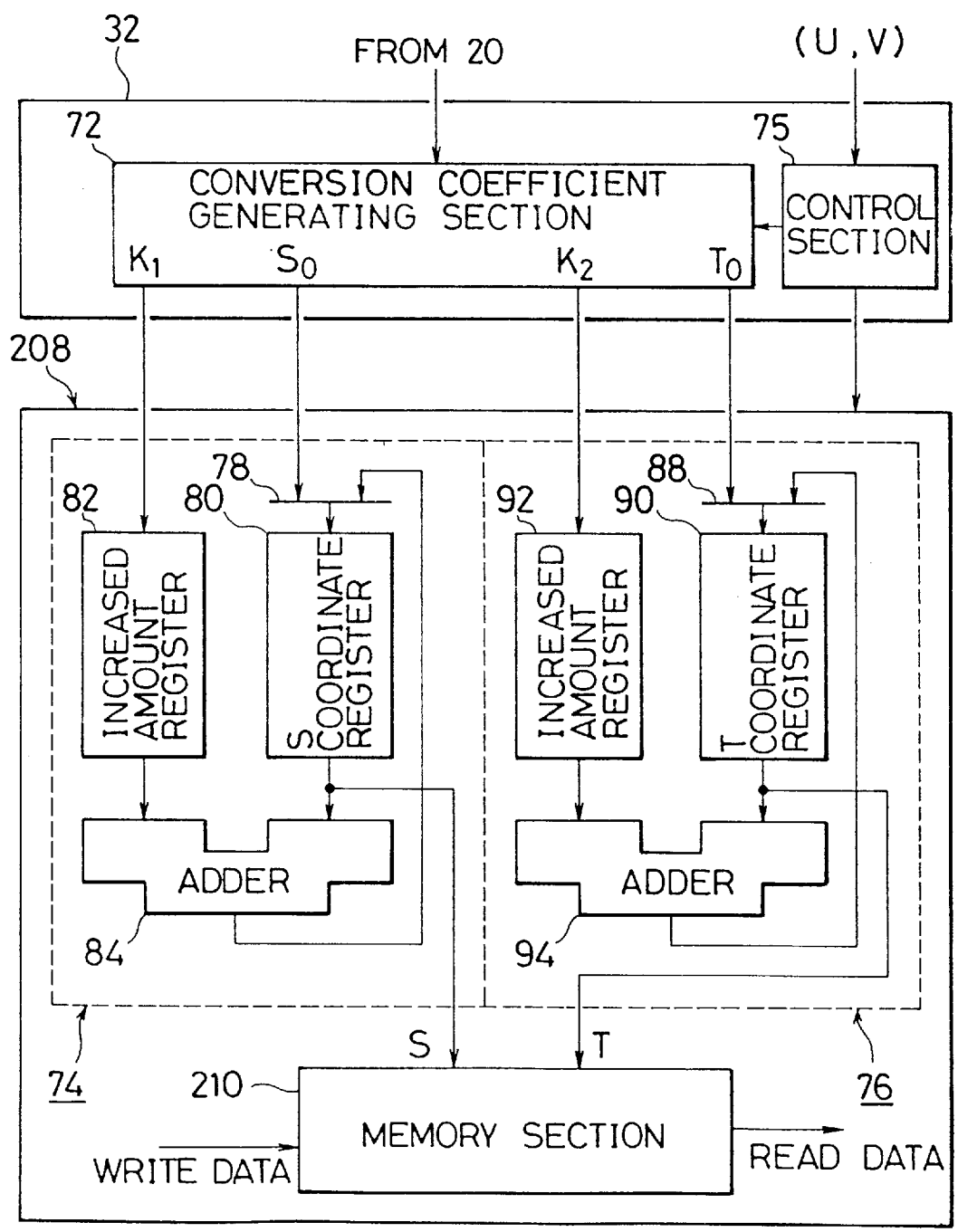
FIG. 42 is a block diagram showing the first embodiment of a texture pattern memory having an interpolation calculating mechanism therein.

FIG. 42 shows the first embodiment of a texture pattern memory having therein an interpolation operating mechanism which is used in the 3-dimensional drawing mechanism 22 in FIG. 3. The S coordinate calculating section 74, T coordinate calculating section 76, and a memory section 210 are provided in a texture pattern memory 208. The S coordinate calculating section 74 is constructed by the selector 78, S coordinate register 80, increased amount register 82, and adder 84. An output of the adder 86 is supplied to the other input terminal of the selector 78. The T coordinate calculating section 76 is constructed by the selector 88, T coordinate register 90, increased amount register 92, and adder 94. The operations of the S coordinate calculating section 74 and T coordinate calculating section 76 which construct the interpolation calculating mechanism are substantially the same as those in the embodiment in which the interpolation calculating mechanism is provided for the drawing processing unit 32 in FIG. 17 except that the increased amount values $K_1$ and $K_2$ and the initial values $s_0$ and $t_0$ are supplied from the external drawing processing unit 32.

Figure 43:
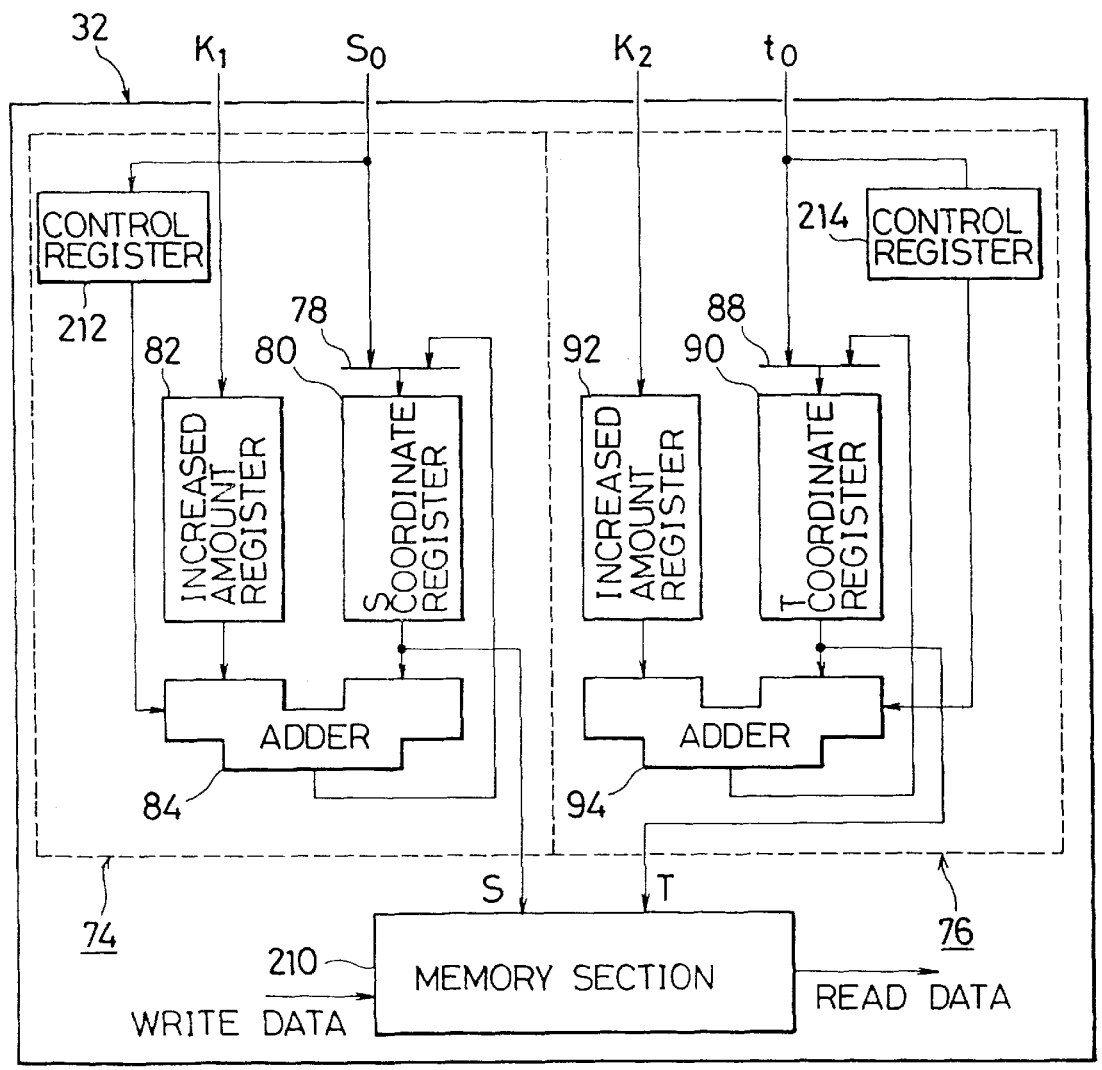
FIG. 43 is a block diagram showing the second embodiment of a texture pattern memory having an interpolation calculating mechanism therein.

FIG. 43 shows the second embodiment of the memory device having therein the interpolation operating mechanism. In the texture pattern memory 208 in FIG. 42, in case of continuously mapping one texture pattern, the coordinate values (s, t) of the S coordinate register 80 and T coordinate register 90 are allowed to overflow and are returned to the origin (0, 0), thereby enabling the texture pattern to be continuously mapped. In the case where the memory area is divided and a plurality of texture patterns are stored into the divided small memory areas, however, since they enter the neighboring texture patterns, so that the same pattern cannot be continuously read out. In the second embodiment of FIG. 43, the area in the memory section 210 built in the texture pattern memory 208 is divided, thereby enabling the texture patterns stored in the divided areas to be repeatedly read out. For this purpose, control registers 212 and 214 are newly provided. In the control register 212, upper bits of the S coordinate values which are added and outputted by the S coordinate adder 84 are fixed to the values which are determined in the divided areas and only lower bits are changed. Specifically speaking, upper bits of the initial value $s_0$ which is set into the S register 80 are held and uper bits of the addition output of the coordinate adder 84 are fixed to the values of the upper bits held.

In the control register 214, upper bits of the T coordinate values which are added and outputted by the T coordinate adder 94 are fixed to the values which are determined by the divided areas and only lower bits are changed. Practically speaking, upper bits of the initial value $t_0$ which is set into the T register 90 are held and upper bits of the addition output of the coordinate adder 84 are fixed to the value of the upper bits held. By fixing the upper bits of the addition outputs of the S coordinate adder 84 and T coordinate adder 94 by the control registers 212 and 214 as mentioned above, the coordinate values (s, t) in which the upper bits are fixed and only lower bits are changed are calculated in response to the changes in input coordinate values (u, v) of the UV surface shape. The texture pattern stored in the area of the ST texture coordinates which are determined by the fixed upper bits can be repeatedly read out. For example, when it is now assumed that the number of divided areas in the S-axis direction is set to m and the number of divided areas in the T-axis direction is set to n, it is sufficient that upper bits of the S coordinate value of m/2 bits are fixed and upper bits of the T coordinate values of n/2 bits are fixed. The number of divided areas of the memory area in the above case is equal to (m+n). For example, in case of dividing the memory area into four areas by dividing the memory area into ½ in each of the S-axis and T-axis directions=, namely, by setting m=n=2, the most significant bit is fixed. On the other hand, in case of dividing the memory area into eight areas by setting m=n=4, upper two bits are fixed.

FIG. 44 relates to the case of dividing the memory area into four areas by setting m=n=2 in the S-axis and T-axis directions. Either one of four-areas $A_{00}$, $A_{10}$, $A_{01}$, and $A_{11}$ is selected in accordance with a combination of the most significant bits of the S and T coordinate values. The pattern can be continuously read out from the selected area. For example, it is now assumed that the initial value $s_0$=000000 is set into the S coordinate register 80, the increased amount value $K_1$=00100000 is set into the S increased amount register 82, the initial value $t_0$=00000000 is set into the T coordinate register 90, and the increased amount value $K_2$=00100000 is set into the increased amount value register 92, respectively. Further, it is now assumed that the most significant bits in the control registers 212 and 214 are fixed to 0. In this case, the outputs of the S coordinate adder 84 and T coordinate adder 94 are changed as follows.

00100000→01000000→01100000→00000000→00000000→...

Therefore, the texture pattern stored in the area $A_{00}$ in FIG. 44 can be repeatedly read out.

As mentioned above, since the upper bits of the S adder 84 and T adder 94 are fixed to the values of the S increased amount register 82 and T increased amount register 92 by the S coordinate register 80 and T coordinate register 90, the area in the memory section 210 is divided and the pattern can be repeatedly read out from the divided area.

Interpolation Operating Mechanism of Pixel Color Value

Figure 45:
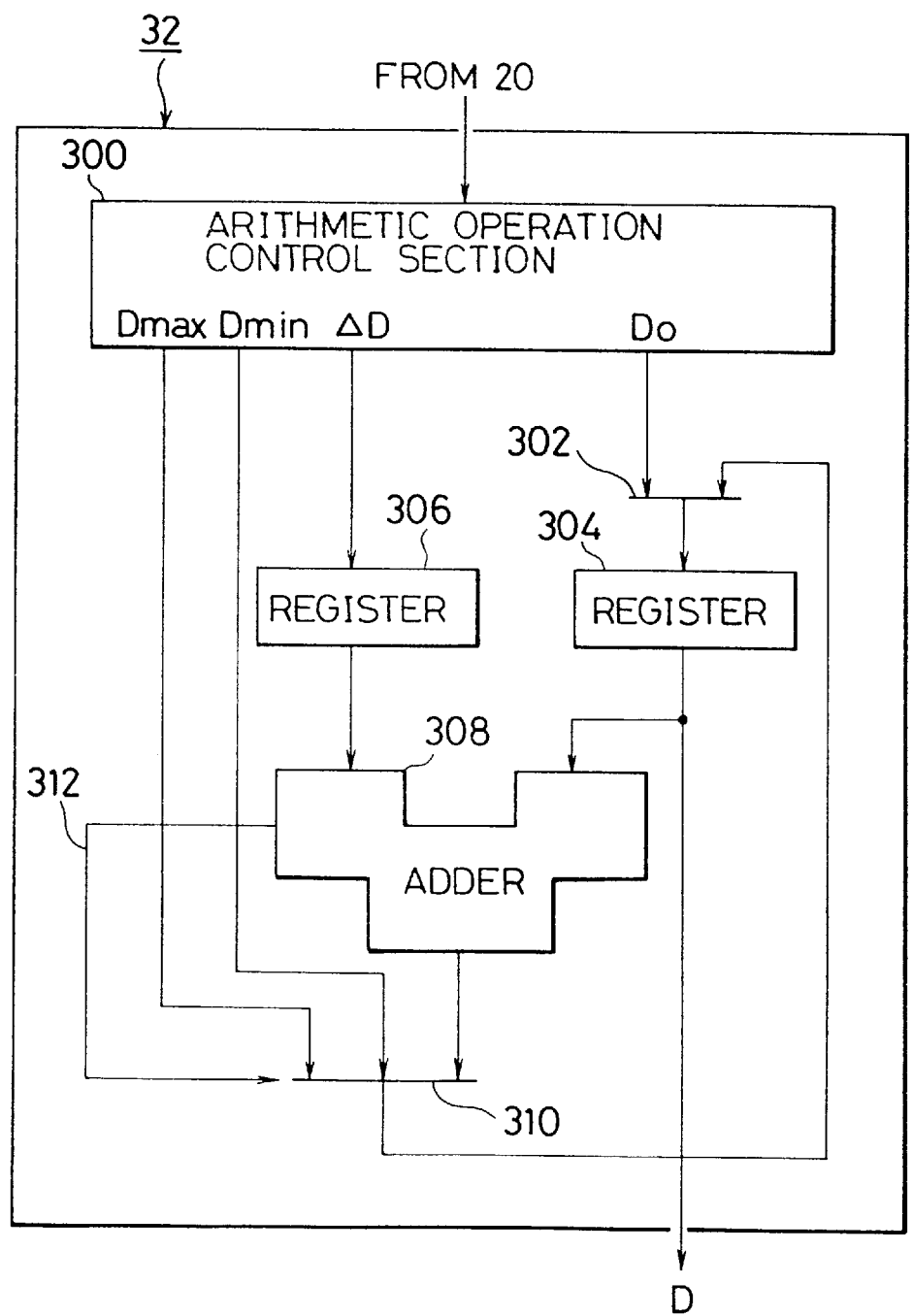
FIG. 45 is a block diagram showing an embodiment of an interpolation calculating mechanism of color values according to the present invention.

FIG. 45 shows an interpolation calculating mechanism of pixels which are used for drawing of the frame memory which is realized by each of the drawing processing units provided for the 3-dimensional drawing mechanism 22 shown in FIG. 9. As shown in FIG. 46A, on the basis of two vertex pixels whose RGB color values are known and are indicated by black dots, in order to execute the interpolating calculation by setting the left side to a start point and setting the right side to an end point, an arithmetic operation control section 300 calculate change ratios $\Delta D_R$, $\Delta D_G$, and $\Delta D_B$ of the RGB color values between the vertex pixels. In this case, $\Delta D_R$=-1.2

$\Delta D_G$=+2.2

$\Delta D_B$=+1.0

RGB initial values $D_0$ of the visual point pixel are set to 7, 2, and 7.

The initial values $D_0$ of the start point pixel obtained by the arithmetic operation control section 300 by the selection by a selector 302 are first set into a first register 304 in FIG. 45. Change values $\Delta D$ obtained by the control section 300 are set into a second register 306. Since the color values have three components of RGB as shown in FIG. 46A, it is possible to provide three interpolation operating mechanisms in FIG. 45 and to execute parallel arithmetic operations or it is also possible to sequentially calculate RGB by using one interpolation operating mechanism. An adder 308 adds the color value D of the first register 304 and the change value ΔD of the second register each time the pixel position is increased and stores the result of the addition into the first register 304 through a selector 310. A storage value D of the first register 304 in this instance is equal to the color value of the pixel. A similar adding process is repeated until the pixel position is increased to the final pixel position.

In the case where the selector 310 has been fixed to the output of the adder 308, as shown in FIG. 46B, when the final pixel indicated by a black dot at the right edge is calculated, the R component causes an underflow and is set to 15. The G component causes an overflow and is set to 0. According to the invention, therefore, when the adder 308 causes an underflow by the calculation of the final pixel of the R component, the minimum value $D_{min}=0$ as a color value of the pixel at the left edge is selected from the control section 300 by a selector 312 and is outputted. When the adder 308 causes an overflow by the calculation of the final pixel of the G component, the maximum value $D_{max}=0$ as a color value of the pixel at the left edge is selected from the control section 300 by the selector 312 and is outputted. Due to this, as shown in FIG. 47C, even when the adder causes an underflow or overflow at the final pixel position, the correct color values R=0 and G=15 can be obtained.

Image Synthesis

Figure 47:
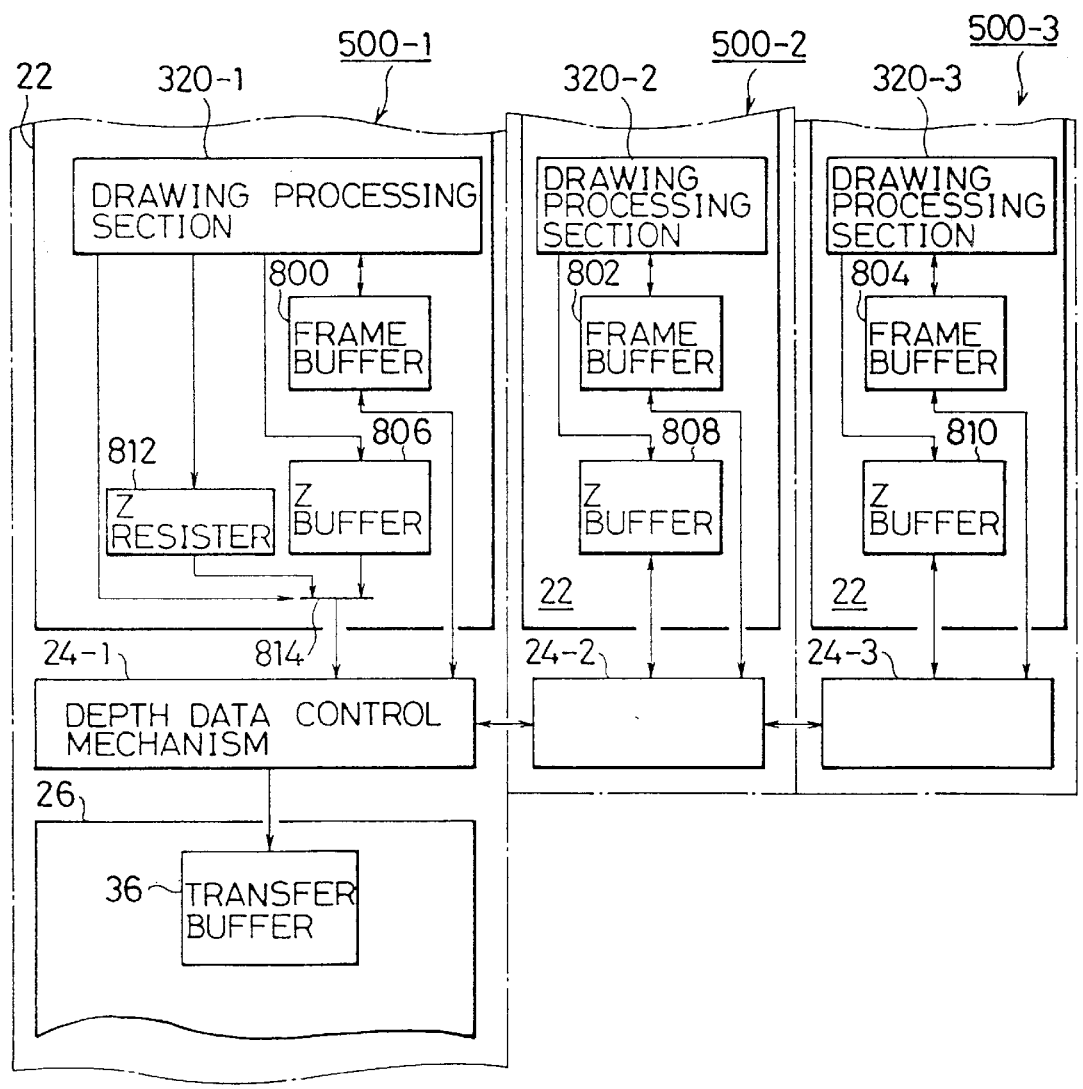
FIG. 47 is a block diagram showing the details of a 3-dimensional drawing mechanism of the present invention having a Z register.

FIG. 47 shows in detail the 3-dimensional drawing mechanism 22 in case of coupling three units in FIG. 3. In the embodiment, frame buffers 800, 802, and 804 and Z buffers 806, 808, and 810 are provided for drawing processing sections 320-1 to 320-3 provided for the units 500-1 to 500-3. As shown in FIG. 9, each of drawing processing sections 320-1 to 320-3 has eight drawing processing units. 3-dimensional drawing information is supplied in parallel by eight channels to each drawing processing section. The 3-dimensional drawing information has 3-dimensional coordinates (x, y, z) and RGB pixel data per one pixel. The RGB pixel data is written into the frame buffers 800, 802, and 804 on a picture plane unit basis by the address designation by the XY display coordinate values (x, y). The depth coordinate value z of each pixel, namely, the z value is written into the Z buffers 806, 808, and 810 on a picture plane unit basis by the address designation by the XY display coordinate values (x, y). The z values in the Z buffers 806, 808, and 810 are used in the hidden image process when a plurality of picture planes are synthesized by depth data control mechanisms 24-1, 24-2, and 24-3 and the synthesized image data is stored into the transfer buffer 36 of the 2-dimensional drawing mechanism 26 of a unit 500-1. Further, a Z register 812 is provided. The Z register 812 allows the z value when a background picture plane or the like such that the depth coordinate values of all of the pixels are equal is drawn to be stored into the frame buffer 800. When the z value is stored into the Z register 812, the z value of every pixel is not written into the Z buffer 806, so that the Z buffer 806 becomes an unused buffer. Either one of the Z buffer 810 and the Z register 812 is selected by using a selector 814. In case of synthesizing three images stored in the frame buffers 800, 802, and 804, the depth control mechanisms 24-1 to 24-3 write the RGB pixel data having the minimum z value among the three z values read out from the Z buffers 806, 808, and 810 into the transfer buffer 36 as effective data.

Figure 48:
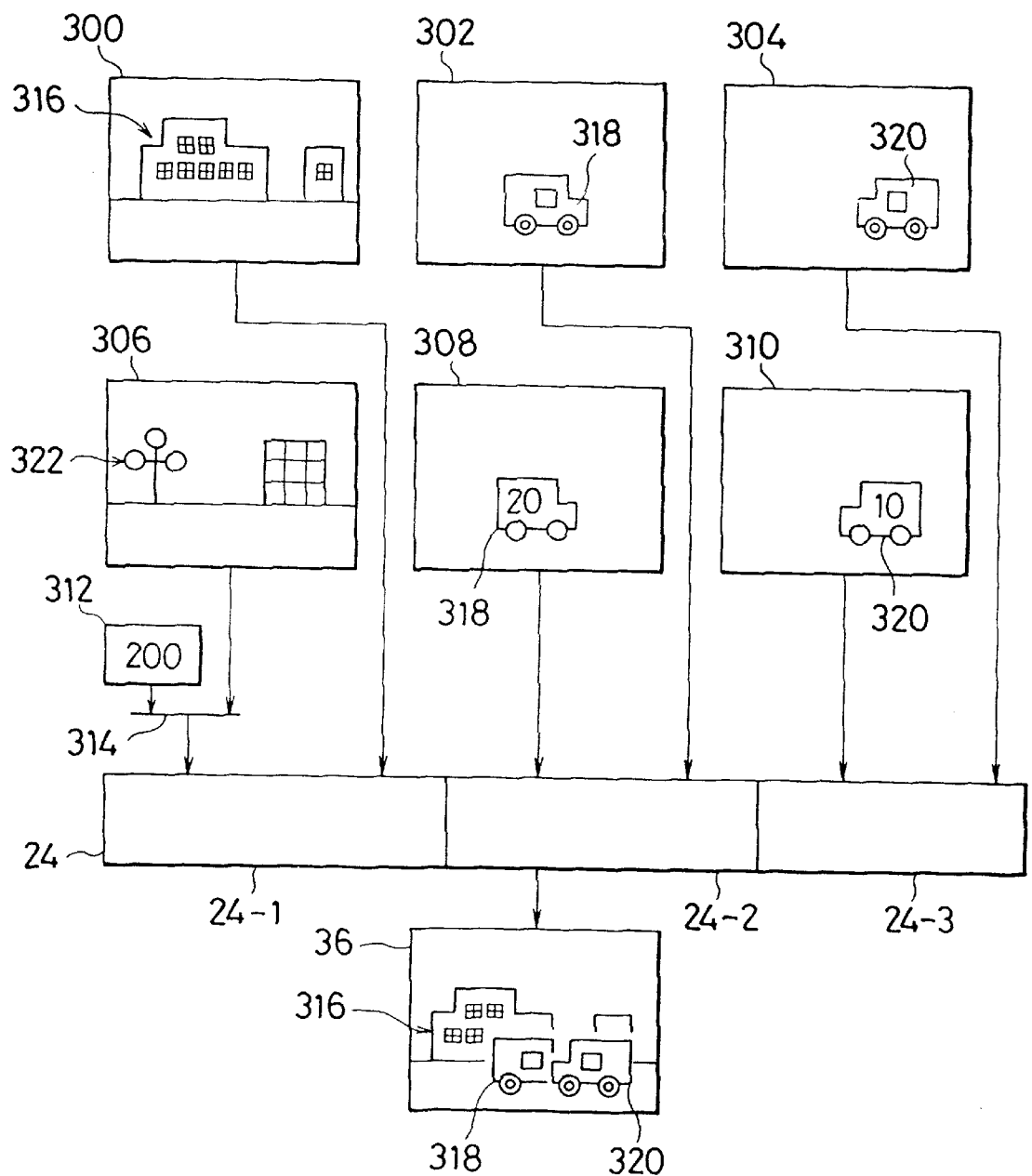
FIG. 48 is an explanatory diagram showing a processing function of an image synthesis in FIG. 47.

FIG. 48 shows a picture plane synthesizing process according to the embodiment of FIG. 47. A background 316 is drawn in the frame buffer 800. All of the z values are set to the same value "200" and this value is written into the Z register 812. A car 318 is drawn in the frame buffer 802 and the z value is set to "20". A car 320 is drawn in the frame buffer 804 and the z value is set to "10". Further, a background 322 which is used to synthesize the next picture plane is stored into the Z buffer 806 which can be used as a work buffer by using the Z register 812.

In the above state, the following operations are executed. First, when the whole control section 10 notifies the use of the Z register 812 to the drawing processing section 32, a write enable state into the Z register 812 is formed. Subsequently, since the 3-dimensional drawing data of the background 316 is supplied under control of the whole control section 10, RGB pixel data of the background 316 is first written into the frame buffer 800 by the address designation by the XY display coordinates (x, y). Subsequently, the writing operation into the frame buffer 806 is executed. However, since the use of the Z register 812 has been instructed from the whole control section 10, the z value "200" as a same value in the whole background 316 drawn in the frame buffer 800 is written. After that, the car 318 is drawn into the frame buffer 802 and the z value is written into the Z buffer 808. In this case, the z value of the car 318 is set to "20" and all of the z values of the background are set to "255" and the value larger than the z value "200" of the background 316 is used. Further, the car 320 is drawn into the frame buffer 804 and the z value is written into the Z buffer 810. In this case, the z value of the car 320 is set to "10" and all of the z values of the background are set to "255". Further, the drawing processing section 320-1 draws the background 322 which is used in the synthesis of the next picture plane into the Z buffer which is in an unused state. In this instance, the host computer notifies the drawing unit 500-1 so as to draw another background into the unused Z buffer 806. After completion of the drawing operation by the 3-dimensional drawing mechanism 22, a merge control is instructed from the whole control section 10 to the depth data control mechanisms 24-1 to 24-3. The depth data control mechanisms 24-1 to 24-3 read out the z values every pixel from the Z register 812 and Z buffers 808 and 810. However, it is sufficient to execute the reading operation from the Z register 812 only the first time. Among the three z values read out, the minimum value on this side is discriminated. The RGB pixel data is read out from either one of the frame buffers 800, 802, and 804 corresponding to the minimum z value and written into the transfer buffer 36 of the 2-dimensional drawing mechanism 26. By the above processes, the synthetic image which was hidden-image processed in accordance with the z values in the case where the cars 318 and 320 were put in front of the background 316 is drawn in the transfer buffer 36. As shown in FIG. 9, the synthetic image in the transfer buffer 36 is transferred to the display frame memory 38. After that, it is read out from the display control section 40 and is displayed on the color display 28. Subsequently, when a switching instruction of the background is received from the whole control section 10, the background 322 which has previously been drawn in the Z buffer 806 is read out and is transferred to the frame buffer 800 at a high speed. Due to this, in the frame buffer 800, an image is drawn to a picture plane at a high speed from the background 316 to the background 322 and an image synthesis using the next background 322 is executed. In FIG. 47, the Z register 312 which can be switched by the selector 814 has been provided for only the Z buffer 806 of the unit 500-1. However, Z registers which can be switched by the selector can be also similarly provided with respect to the Z buffers 808 and 810 of other remaining units 500-2 and 500-3.

Arrange Z Buffer into Main Storage Unit

Figure 49:
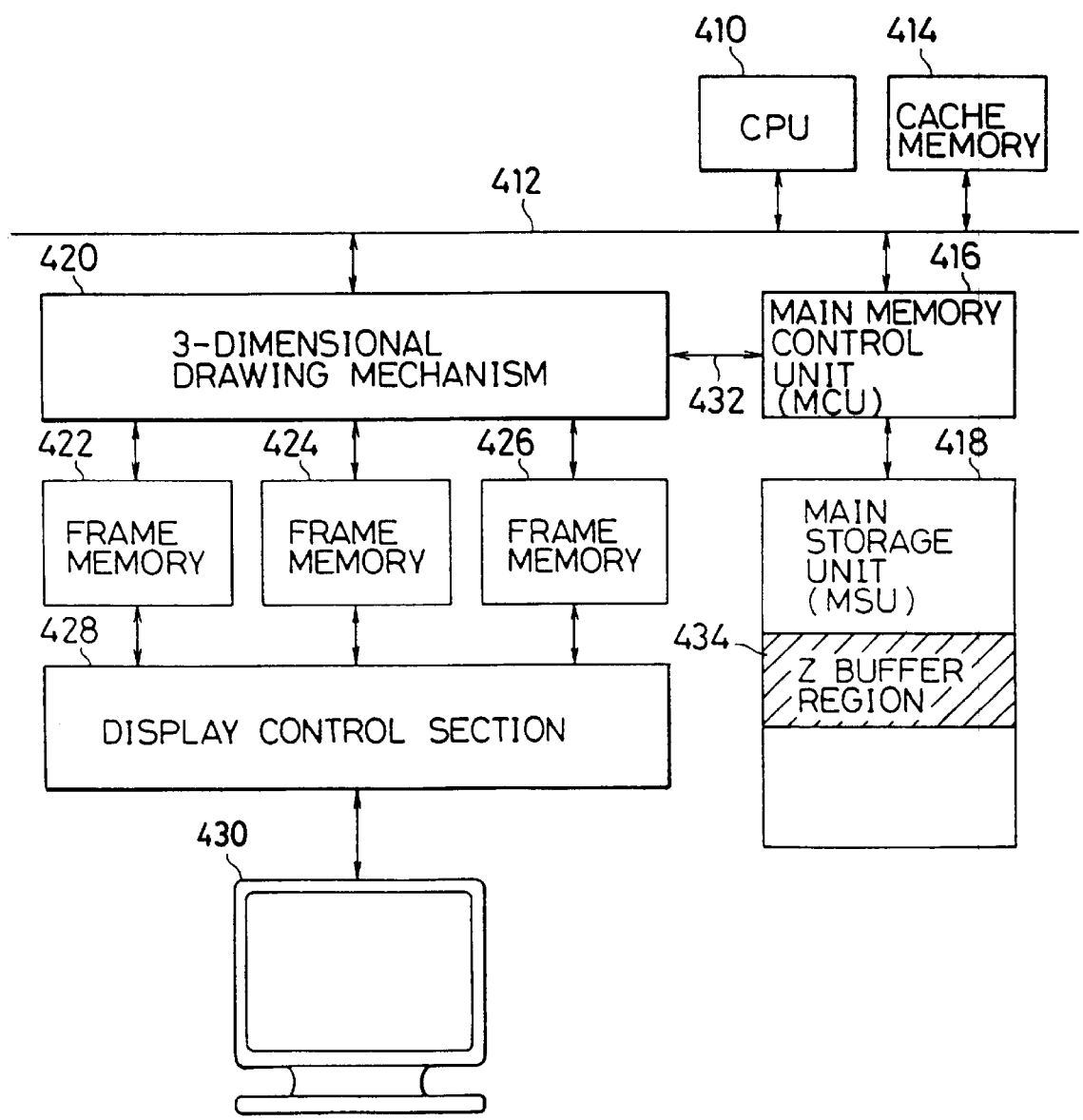
FIG. 49 is a block diagram of an embodiment in which a Z buffer is arranged in a main storage unit.

FIG. 49 shows an embodiment of the present invention with respect to a workstation as an example. A main storage unit 418 is connected through a main memory control unit 416 to a main bus 412 as a bus of a CPU 410 provided for a workstation. Further, a cache memory 414 as a secondary memory device is connected to the main bus 412. Only when the cache memory 414 doesn't hit, the CPU 410 accesses the main storage unit 418. Since the cache memory 414 is provided, a frequency of the accessing times of the main storage unit 418 is reduced and a high processing speed can be realized. A 3-dimensional drawing mechanism 420 is connected to the main bus 412 of the CPU 410. Frame memories 422, 424, and 426 from/into which the RGB pixel data is read and written by the address designation by the 2-dimensional coordinates (x, y) are provided for the 3-dimensional drawing mechanism 420. At least three frame memories are necessary to synthesize and draw 3-dimensional images. The RGB pixel data before synthesis is stored into two of the three frame memories. The RGB pixel data of the synthetic image which is obtained by synthesizing two 3-dimensional images in the depth direction is stored into one remaining frame memory. Although the frame memories 422, 424, and 426 are separately shown for convenience of explanation, one memory unit can be also divided into three memory areas and used.

After the frame memories 422, 424, and 426, a display control section 428 is provided. The display control section 428 reads out the synthetic image obtained by synthesizing two images from the special frame memory and converts into the analog signal and displays on a color display 430 after that. The display control section 428 has a lookup table to perform various kinds of color conversions. For example, in case of using a palette converting mechanism in order to reduce the number of bits of the pixel data in the 3-dimensional drawing mechanism 420, there is executed a process for converting the pixel data processed as address data of a palette table into the original RGB data by the lookup table of the display control section 428. In case of the color display 430, it is sufficient to use the RGB data. However, in the case where a printer using a CMYK space is used as an output apparatus, the color conversion from the RGB space into the CMYK space is executed. It is also possible to convert from the RGB space into the XYZ space, L*a*b* space, L*u*v* space, or an HSB space or SSV space which is known as a color space which reflects the color perception of human being and which expresses three components of hue, saturation, and brightness, or the like. Moreover, in the case where the RGB space has linear characteristics, the color resolution can be also increased by converting the linear characteristics into the non-linear characteristics or by executing a bit-up process to increase the number of bits of the pixel data.

The 3-dimensional drawing mechanism 420 has a local bus 432 in addition to the main bus 412 and is connected to the CPU 410 through the main bus 412 and is also directly connected to the main memory control unit 416 through the local bus 432. The control unit 416 accepts both of the access from the main bus 412 of the CPU 410 and the access from the local bus 432 of the 3-dimensional drawing mechanism 420 and executes the writing or reading operation of the main storage unit 418. When the access from the main bus 412 competes with the access from the local bus 432, the access having a higher priority is selected in accordance with the setting of the priority mode at that time and the reading or writing operation of the main storage unit 418 is executed. A Z buffer area 434 which has previously been allocated to the 3-dimensional drawing mechanism 420 is assured in the main storage unit 418. The 3-dimensional drawing apparatus 420 accesses the Z buffer area 434 by using the local bus 432.

Figure 50:
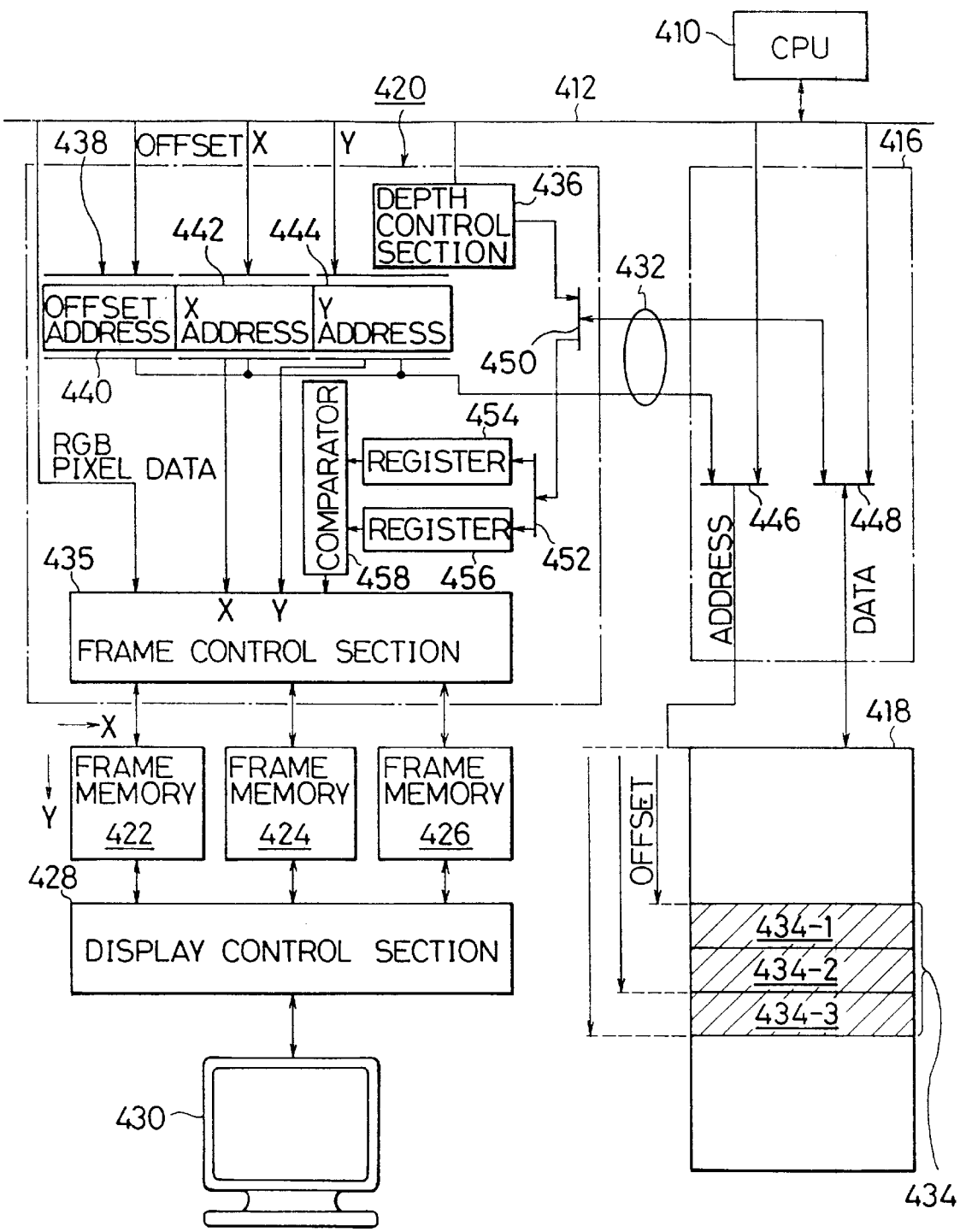
FIG. 50 is a block diagram showing the details of FIG. 49.

FIG. 50 shows in detail the 3-dimensional drawing mechanism and the main memory control unit connected by the local bus in FIG. 49. The drawing mechanism 420 has an address register 438 to generate an address to access the Z buffer area 434 in the main storage unit 418. The address register 438 has an upper offset address 440 and lower X address 442 and Y address 444. The offset value up to the start position of the Z buffer area 434 provided for the main storage unit 418 is set into the offset address 440 by the CPU 410. In the embodiment, since the three frame memories 422, 424, and 426 are provided, the Z buffer area 434 in the main storage unit 418 is divided into three buffer areas 434-1, 434-2, and 434-3 in correspondence to the frame memories 422, 424, and 426. Therefore, three offset values corresponding to the divided buffer areas 434-1 to 434-3 are prepared. The offset values adapted to the accesses of the frame memories 422, 424, and 426 are set as an offset address 440 into the address register 438.

As mentioned above, the CPU 410 arbitrarily changes the value of the offset address 440 as necessary and can set the Z buffer area 434 into an arbitrary area in the main storage unit 418. The 2-dimensional coordinates (x, y) which are used for address designation when the CPU 410 accesses the frame memory 422, 424, or 426 are set every pixel into the X address 442 and Y address 444 of the address register 438. The values of the X address 442 and Y address 444 are used to designate the drawing address of the frame 422, 424, or 426 and is also used for address designation of the z data storing position of either one of the divided buffer areas 434-1 to 434-3 designated by the offset address of the main storage unit 418.

The CPU 410 now handles a 3-dimensional object expressed by a set of polygons using micro triangles or quadrilaterals. Each polygon is constructed by the vertex coordinates (x, y, z) and the color value, for example, RGB data of each vertex. When the 3-dimensional object is drawn, the CPU 410 develops the vertex coordinates (x, y, z) of the polygon into the pixels which bury the surfaces of the polygon. The CPU 410 supplies the pixel coordinates (x, y, z) and the pixel RGB data to the 3-dimensional drawing mechanism 420 as 3-dimensional drawing data every pixel. The 3-dimensional drawing mechanism 420 sets the 2-dimensional coordinates (x, y) in the 3-dimensional drawing data (x, y, z: RGB pixel data) supplied from the CPU 410 into the X address 442 and Y address 444. The RGB pixel data from the CPU 410 is given to a frame control section 435 and is written into either one of the frame memories 422, 424, and 426 by the address designation by the 2-dimensional coordinates (x, y). Further, the z data indicative of the depth coordinates of each pixel supplied from the CPU 410 is given to the main memory control unit 416 from a depth control section 436 through the local bus 432. The z data is written into either one of the divided buffer areas 434-1 to 434-3 of the main storage unit 418 designated by the offset value of the address register 438. That is, the z data supplied from the CPU 410 is given to the control unit 416 from a selector 450 through the local bus 432. An address selector 446 and a data selector 448 are provided for the control unit 416 and can select either one of the main bus 412 and the local bus 432. For the depth control unit 436, either one of the divided buffer areas 434-1 to 434-3 is designated by the offset address 440 set in the address register 438. The z data from the CPU 410 is also written into the address which is designated by the X address 442 and Y address 444 in the designated area.

After the 3-dimensional drawing data was stored into the frame memory and the Z buffer area 434, a synthesizing process of a plurality of picture planes is executed by the depth control section 436 by using registers 454 and 456, a comparator 458, and the frame control section 435 provided in the 3-dimensional drawing mechanism 420. It is now assumed that the first image is drawn in the frame memory 422, the depth coordinates of the first image are stored as $z_1$ data into the divided buffer area 434-1, the second image is drawn in the frame memory 424, and the depth coordinates of the second image are stored as $z_2$ data in the divided buffer area 434-2. In this state, when the CPU 410 instructs the merge control to synthesize two picture planes stored in the frame memories 422 and 424, the read address is set from the CPU 410 into the address register 438 of the 3-dimensional drawing mechanism 420. Namely, when the offset value of the divided buffer area 434-1 is set, the first 2-dimensional coordinates (x, y) are simultaneously set. The depth control section 436 requests the read access to the main memory control unit 416 through the local bus 432. The selector 446 of the control unit 416 selects the address value of the address register 438 which is supplied through the local bus 432. The $z_1$ data of the divided buffer area 434-1 of the control unit 416 corresponding to the frame memory 422 is read out and set into the register 454. Subsequently, the value of the offset address 440 is updated to the offset value of the divided buffer area 434-2 corresponding to the frame memory 424. The address in the area is designated by the value of the same X address 442 and Y address 444 and the $z_2$ data is read out and set into the register 456. The switching and setting to the registers 454 and 456 are performed by a selector 452.

When the depth data $z_1$ and $z_2$ of the same frame address of two picture planes can be set into the registers 454 and 456, the comparator 458 compares the two depth data $z_1$ and $z_2$. The result of the comparison is supplied as selection information to the frame control section 435. The frame control section 435 makes smaller one of the two depth data $z_1$ and $z_2$, that is, the data locating on this side effective and designates either effective one of the frame memories 422 and 424 by the X address 442 and Y address 444 at that time, thereby reading the RGB pixel data. The read RGB pixel data is written to the memory location designated by the same X address 442 and Y address 444 in the frame memory 426 for synthesis. By executing the synthesizing process using the depth information with respect to all of the pixels, the 2-dimensional image data synthesized in accordance with the depth information in the frame memory 426 can be drawn. The synthetic image data drawn in the frame memory 426 is transferred to the display control section 428 at a frame period is subjected to a desired conversion by the lookup table. After that, the image data is converted into the analog signal and is displayed as an image by the color display 430.

In the embodiment of FIGS. 49 and 50, three frame memories are provided to simplify the explanation. However, the number of frame memories can be properly decided in accordance with the number of depth images which are synthesized by the 3-dimensional drawing mechanism 420. As a Z buffer area 434 which is prepared in the main storage unit 418, it is sufficient to prepare the Z buffer area of only the necessary capacity in accordance with the number of picture planes, namely, the number of frame memories which are used to synthesize the depth images.

Figure 51:
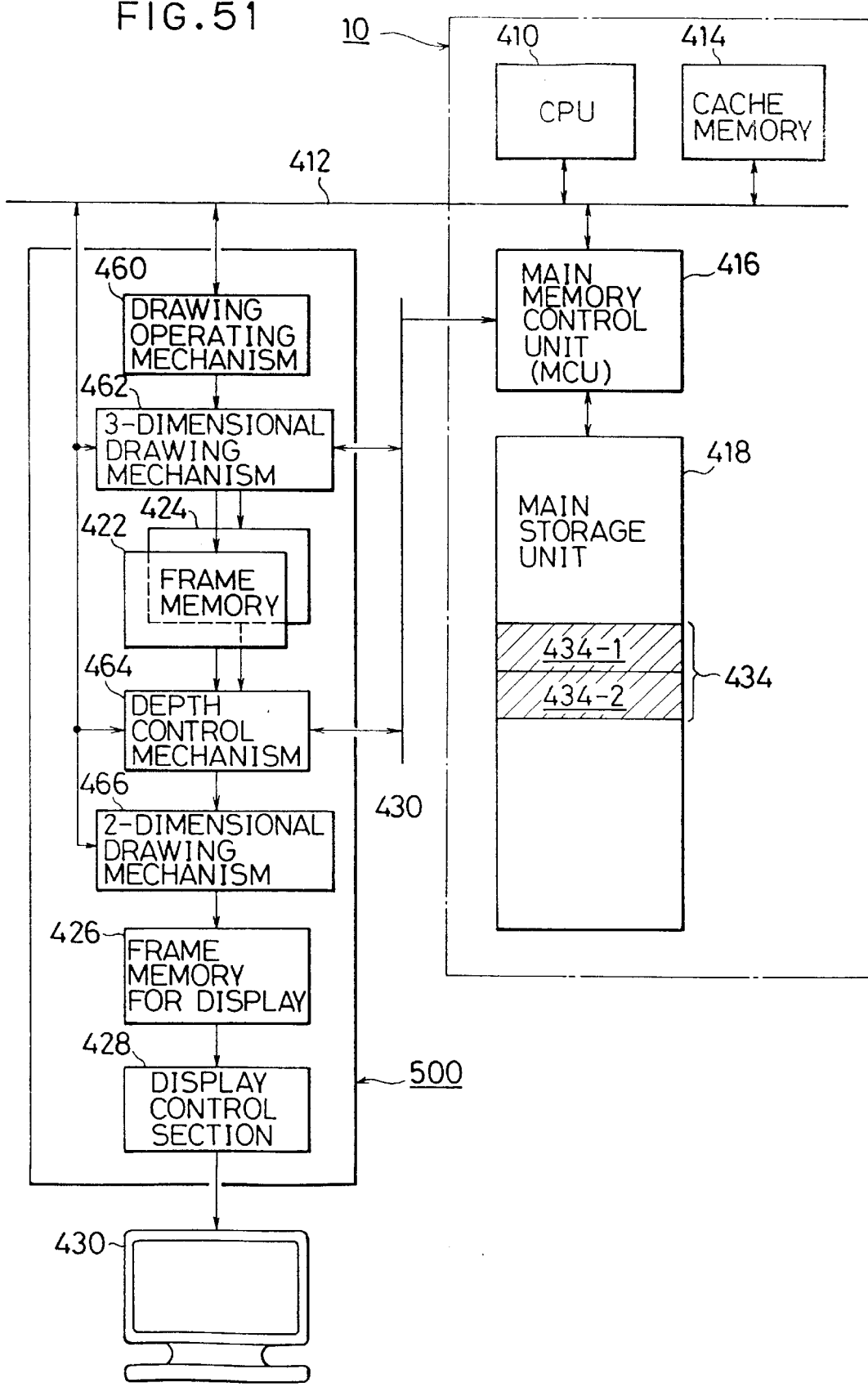
FIG. 51 is a block diagram showing another embodiment in which a Z buffer is arranged in the main storage unit.

FIG. 51 shows another embodiment of the invention in which a Z buffer is provided in the main storage unit. The embodiment is characterized in that in order to reduce a burden of processes on the CPU side, a drawing operating mechanism to develop the 3-dimensional data expressed by a polygon into the 3-dimensional drawing data of the pixel unit is provided on the 3-dimensional drawing mechanism side. In FIG. 51, the main storage unit 418 is connected to the main bus 412 of the CPU 410 through the cache memory 414 and the main memory control unit 416. The above portion corresponds to the whole control section 10 shown in FIG. 3. The main bus 412 corresponds to the system bus 16. On the other hand, a 3-dimensional graphics drawing unit 600 is connected to the main bus 412 of the CPU 410. The drawing unit 600 is constructed by: a drawing operating mechanism 460; a 3-dimensional drawing mechanism 462; frame memories 422 and 424 for drawing; a depth control mechanism 464; a 2-dimensional drawing mechanism 466; frame memory 426; and display control section 428. The drawing operating mechanism 460 receives the vertex coordinates (x, y, z) of the polygon in the CPU 410 and the 3-dimensional data which is constructed by the vertex RGB data (color values) and executes various kinds of processes which are necessary for three-dimensionally drawing. After that, the drawing operating mechanism 460 develops into the 3-dimensional drawing data as a set of pixels which bury the surfaces of the polygon and supplies the pixel coordinates (x, y, z) and RGB pixel data every pixel to the 3-dimensional drawing mechanism 462. The drawing mechanism 462 writes the RGB pixel data into the frame memories 422 and 424 by the address designation by the 2-dimensional coordinates (x, y). At the same time, the drawing operating mechanism 460 accesses the self divided buffer areas 434-1 and 434-2 in the Z buffer area 434 of the main storage unit 418 by the local bus 432 via the main memory control unit 416 and writes the z data corresponding to the writing pixels of the frame memories 422 and 424. That is, the 3-dimensional drawing mechanism 462 has a function as a write control section to the Z buffer area 434 of the depth control section 436 provided for the 3-dimensional drawing mechanism 420 in FIG. 50.

The depth control mechanism 464 performs a depth synthesis of the images stored in the frame memories 422 and 424. The depth control mechanism 464 executes the read access of the main storage unit 418 through the local bus 432 and main memory control unit 416 by using the XY addresses to read the frame memories 422 and 424 and the offset address set by the CPU 410. By the read access, two depth data $z_1$ and $z_2$ are read out from the Z buffer area 434 every frame memories 422 and 424. The frame memory corresponding to the smaller depth data is made effective and the RGB data is read out and supplied to the 2-dimensional drawing mechanism 466. The 2-dimensional drawing mechanism 466 writes the RGB data supplied from the depth control mechanism 464 into the display frame memory 426 by the designation of the XY addresses at that time. By executing the above processes for one picture plane, the synthetic image in the depth direction of two picture planes can be obtained in the frame memory 426. The 2-dimensional drawing mechanism 466 can directly be subjected to the window control by the main bus 412 of the CPU 410 in addition to the transfer and writing operations into the display frame memory 426 of the depth synthetic image from the depth control mechanism 464. While the window control is being executed by the CPU to the 2-dimensional drawing mechanism 466, according to the embodiment, since the 3-dimensional drawing side can independently operate, the 3-dimensional drawing operations into the frame memories 422 and 424 can be executed in parallel during such a period of time.

In the embodiment of FIG. 51, by providing the drawing operating mechanism 460 for the 3-dimensional graphics drawing unit 500, the burden on the CPU 410 is reduced and the drawing performance is raised. However, it is also possible to realize the function of the drawing operating mechanism 460 by the CPU 410 and by arrange the CPU 410 after the 3-dimensional drawing mechanism 462. In the above embodiment, although the Z buffer area 434 of the main storage unit 418 has been shown as one area, the Z buffer area can be also arbitrarily distributed and arranged in the main storage unit.

The present invention is not limited to the foregoing embodiments but many modifications and variations are possible within the spirit and scope of the appended claims of the invention. The invention is also not limited by the numerical values shown in the embodiments.

What is claimed is:

1. A 3-dimensional graphics drawing apparatus comprising:

a plurality of frame buffer means for writing pixel data into an address designated by coordinate values (x, y) of XY display coordinates and for storing an image;

Z buffer means for storing a plurality of coordinate values (z) indicating a depth direction for each of the pixel data written by said frame buffer means;

Z register means for writing a single coordinate value (z), instead of storing the coordinate value (z) of every pixel in the Z buffer means, where the coordinate values (z) in the depth direction of the pixel data stored in the frame buffer means have the same value for all of the pixel data; and merge means for selecting visible pixel data from a plurality of pixel data read from said plurality of frame buffer means on the basis of the coordinate value (z) in said Z buffer means and said Z register means and for writing the selected pixel data into a frame buffer for synthesis.

2. An apparatus according to claim 1, wherein the image in which the single depth coordinate value (z) is written into said Z register means is a background image which is used for image synthesis.

3. An apparatus according to claim 1, wherein when the Z buffer means is unused, because the single depth coordinate value (Z) is used, the Z buffer means is used as a work buffer means, and a background image having the same depth coordinate value (z) which is used for a next image synthesis is written into said work buffer means.

* * * * *